US012107883B2

(12) United States Patent
Stergioudis

(10) Patent No.: US 12,107,883 B2
(45) Date of Patent: Oct. 1, 2024

(54) MULTIMODAL MODELLING FOR SYSTEMS USING DISTANCE METRIC LEARNING

(71) Applicant: Citrix Systems, Inc., Fort Lauderdale, FL (US)

(72) Inventor: Asterios Stergioudis, Poligiros (GR)

(*) Notice: Subject to any disclaimer, the term of this patent is extended or adjusted under 35 U.S.C. 154(b) by 697 days.

(21) Appl. No.: 17/188,601

(22) Filed: Mar. 1, 2021

(65) Prior Publication Data

US 2022/0201008 A1 Jun. 23, 2022

Related U.S. Application Data

(63) Continuation of application No. PCT/GR2020/000065, filed on Dec. 21, 2020.

(51) Int. Cl.
*H04L 9/40* (2022.01)
*G06N 20/00* (2019.01)
*H04L 67/14* (2022.01)

(52) U.S. Cl.
CPC ........... *H04L 63/145* (2013.01); *G06N 20/00* (2019.01); *H04L 67/14* (2013.01)

(58) Field of Classification Search
CPC ... H04L 63/145; H04L 63/1425; H04L 67/14; G06N 20/00; G06N 3/045; G06N 3/088; G06F 21/316
See application file for complete search history.

(56) References Cited

U.S. PATENT DOCUMENTS

| 11,741,369 | B2 * | 8/2023 | Sather | G06V 10/764 |
| | | | | 382/118 |
| 11,961,598 | B1 * | 4/2024 | Finley | G06N 20/00 |
| 2019/0068627 | A1 * | 2/2019 | Thampy | H04L 63/1425 |
| 2019/0158535 | A1 * | 5/2019 | Kedem | H04W 12/12 |
| 2020/0184268 | A1 * | 6/2020 | Lewis | G06N 20/00 |
| 2020/0195683 | A1 * | 6/2020 | Kuppa | H04L 63/1441 |
| 2020/0292646 | A1 * | 9/2020 | Spanoudaki | G01R 33/36 |
| 2020/0387411 | A1 * | 12/2020 | Chu | G06F 16/5866 |
| 2021/0141897 | A1 * | 5/2021 | Seifert | G06F 21/561 |
| 2021/0157577 | A1 * | 5/2021 | Sobran | G06F 11/302 |
| 2022/0101438 | A1 * | 3/2022 | Gao | G06Q 30/0201 |

(Continued)

FOREIGN PATENT DOCUMENTS

| CN | 111324765 A | * | 6/2020 | |
| CN | 113961704 A | * | 1/2022 | |
| JP | 2021099803 A | * | 7/2021 | G06F 16/90348 |

*Primary Examiner* — Sarah Su

(57) ABSTRACT

Described embodiments provide systems and methods for managing session accessed by a client device. The systems and methods can include one or more processors configured to receive data in a plurality of modalities corresponding to a plurality of features of a session for an entity accessed by a client device. The one or more processors can determine based on the data of the session and a distance model trained with historical data of the entity, a distance between a representation of the data of the session and a predetermined representation for the entity established based on the historical data of the entity. The one or more processors can compare the distance with a threshold established for the entity. The one or more processors can generate, based on the comparison between the distance with the threshold, an action to manage access by the client device to the session for the entity.

20 Claims, 17 Drawing Sheets

(56) References Cited

U.S. PATENT DOCUMENTS

| | | | |
|---|---|---|---|
| 2022/0137181 A1* | 5/2022 | Santra | G01S 7/352 |
| | | | 342/450 |
| 2022/0156528 A1* | 5/2022 | Borse | G06V 10/26 |
| 2022/0172106 A1* | 6/2022 | Shang | G06F 16/285 |
| 2024/0073237 A1* | 2/2024 | Herszfang | H04L 63/1433 |
| 2024/0080339 A1* | 3/2024 | Kedem | G06Q 20/16 |

* cited by examiner

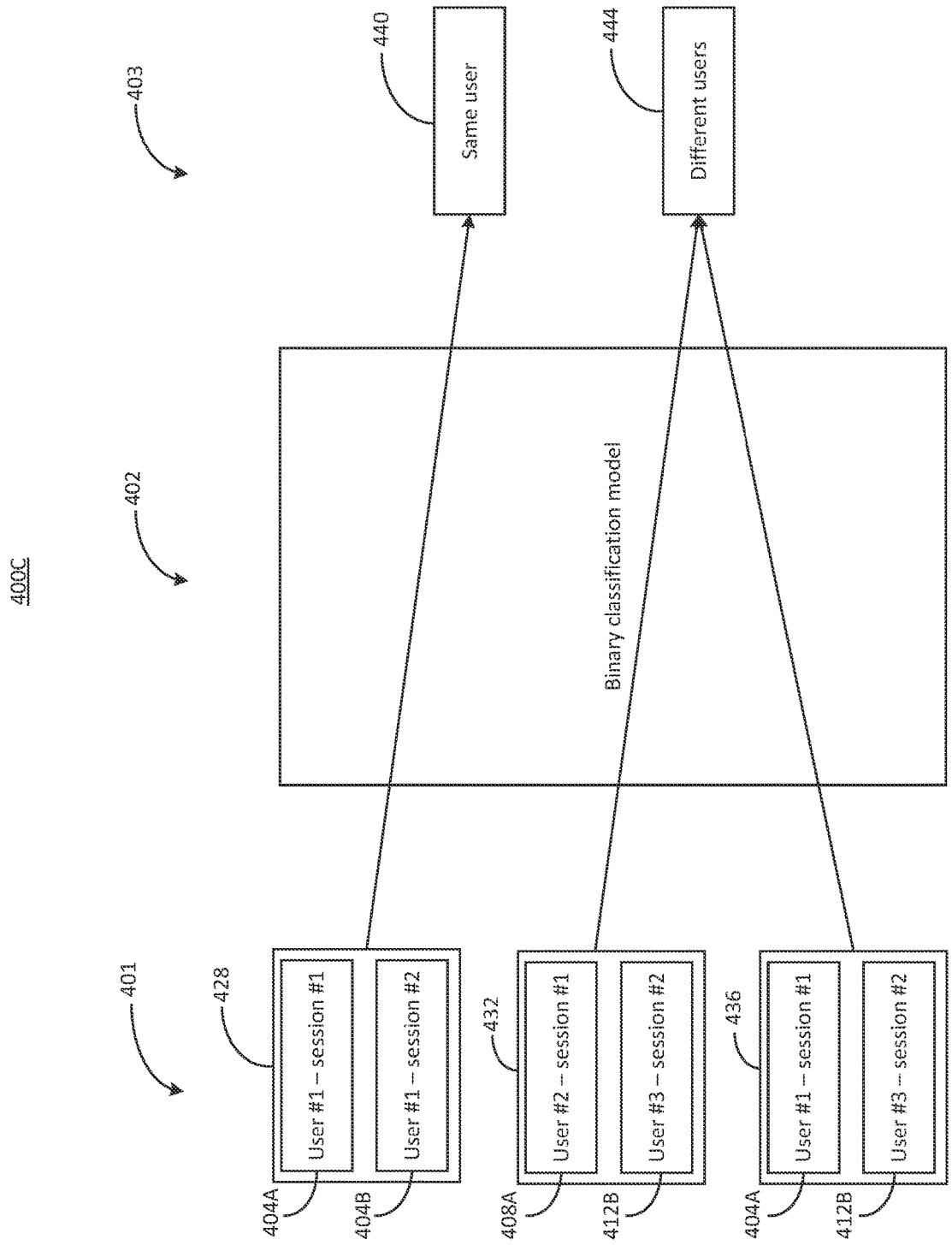

MULTIMODAL MODELLING FOR SYSTEMS USING DISTANCE METRIC LEARNING

CROSS-REFERENCE TO RELATED APPLICATION

This application is a continuation of, and claims priority to and the benefit of, International Patent Application No. PCT/GR2020/000065, titled "MULTIMODAL MODELLING FOR SYSTEMS USING DISTANCE METRIC LEARNING," and filed on Dec. 21, 2020, the contents of all of which are hereby incorporated herein by reference in its entirety for all purposes.

FIELD OF THE DISCLOSURE

This application generally relates to security management, including but not limited to systems and methods for managing access to a session.

BACKGROUND

Client devices can access one or more sessions of an application. The client devices can request authorization to log into a session of the application. Responsive to the request, the application can verify the identity of a user of the client device prior to authorizing and granting the access to the application. As malicious actors become increasingly sophisticated with regard to gaining unauthorized access, it can be challenging for the application to verify the identity of the user to prevent threats, attacks, or fraudulent access to sessions of the application.

SUMMARY

This summary is provided to introduce a selection of concepts in a simplified form that are further described below in the Detailed Description. This Summary is not intended to identify key features or essential features, nor is it intended to limit the scope of the claims included herewith.

This technical solution is directed towards systems and methods for managing a session accessed by a client device. The systems and methods can include features and functionalities performed by a user and entity behavior analytics ("UEBA") system. The UEBA system can collect and analyze user behavior or entity behavior information. The UEBA system can apply statistical analysis or machine learning to detect potential threats, risks, or other scenarios that can indicate an anomaly (e.g. compromised accounts, data exfiltration, insider threats). The UEBA system can utilize unsupervised anomaly detection techniques. The UEBA systems can perform their features and functionalities in conjunction with rule based-approaches or signature based-approaches system to improve the security posture of an organization.

At least one aspect of this technical solution provides systems and methods for session access management. The technical solution can utilize features and functionalities of various Neural Network architectures and structures, such as Fully-Connected Neural Network architecture, Recurrent Neural Network architecture, Convolutional Neural Network architecture, Siamese Neural Network structure, or Triplet Neural Network structure. For example, the Triplet Neural Network can transform multimodal or multivariate data into an internal representation (e.g., embedding the multimodal or multivariate data). The internal representation can be optimized for measuring the similarities or inversely distance between behaviors of a given user or entity relative to the corresponding behaviors previously recorded (e.g., past behaviors, historical events, or other actions recorded in at least one preceding session).

The technical solution can collect information on user behaviors (e.g., or entity behaviors). Features of the collected information can be extracted to identify any patterns of the user behaviors throughout a session (e.g., an application session). The user behaviors can be referred to as, and used interchangeably with other descriptive terms, such as paths, actions, patterns, or other conduct performed by the user within the session. The features extracted from the collected information can include, but not limited to, download volume, site navigation, content selection, number of deleted files, a sequence of user locations, or other events trackable by one or more sensors of the client device and recordable by the application managing the session. By embedding the features extracted from the collected information of the user behaviors, the systems and methods can generate a representation of the user behaviors.

The extracted features can be grouped into multiple data samples based on their types, such as location information, download patterns, or content of interest. These data samples can be provided to a machine learning engine, trained with various sample data, to determine the representation of the user behaviors. This representation may be referred to as a current representation for comparison with a historical representation of past user behaviors throughout other sessions of an application. The representation of the current user behaviors can be generated after a predetermined amount of time to determine the difference between the current and the past user path. The systems and methods can compare the representations of the user (e.g., the current representation and the historical representation of the user) to determine a distance between them. The systems and methods can determine if the distance exceeds a threshold in order to generate an action to manage access to the session.

At least one aspect of this technical solution is directed to a method for managing a session accessed by a client device. The method can include one or more processors receiving data in a plurality of modalities corresponding to a plurality of features of a session for an entity accessed by a client device. The method can include one or more processors determining, based at least in part on the data of the session for the entity and a distance model trained with historical data of the entity that accounts for cross-modal correlations between the plurality of modalities, a distance between a representation of the data of the session and a predetermined representation for the entity established based on the historical data for the entity. The method can include one or more processors comparing the distance with a threshold established for the entity. The method can include one or more processors generating, based at least in part on the comparison between the distance with the threshold, an action to manage access by the client device to the session for the entity.

The method can include one or more processors identifying that the session is provided by a cloud storage service hosted by one or more servers, and the one or more processors are intermediary to the client device and the one or more servers. The plurality of modalities can comprise at least one of numeric data, categorical data, image data, sound data, a sequence of data, or a combination of at least two of the plurality of modalities. The plurality of features can comprise at least one of a number of files downloaded, a file type, a file size, a download duration, a location of the client device, a timestamp, a download volume over a predetermined time interval, or a sequence of electronic remote procedure calls.

The method can include one or more processors accessing a data repository storing a plurality of distance models corresponding to a plurality of entities. The method can include one or more processors selecting, from the data repository, the distance model for the entity from the plurality of distance models. The method can include one or more processors establishing the threshold for the entity based on a distribution of pairwise distances between representations output by a model trained for the entity based on the historical data. The method can include one or more processors determining, based at least in part on the comparison, that the distance is greater than the threshold. The method can include one or more processors selecting, responsive to the distance greater than the threshold, the action based at least in part on a security policy associated with the session, the action comprising at least one of: a request for multifactor authentication, terminating the session, locking an account of the entity to prevent subsequent access to the session, or transmitting a push notification to one or more client devices associated with the entity.

The method can include one or more processors determining that the distance is greater than each of the entity threshold, the global threshold and the peer threshold. The threshold can comprise an entity threshold, a global threshold, and a peer threshold. The method can include one or more processors flagging, responsive to the distance being greater than each of the entity threshold, the global threshold and the peer threshold, the session as malicious.

The method can include one or more processors determining that the distance is greater than zero and less than the threshold for the entity. The method can include one or more processors allowing, responsive to the determination, access by the client device to the session for the entity. The method can include one or more processors training the distance model with the historical data for one or more entities using a distance-based loss function configured to predict relative distances between inputs for the one or more entities.

The historical data for the entity can comprise a first modality of the plurality of modalities, a second modality of the plurality of modalities, and a third modality of the plurality of modalities. The method can include one or more processors inputting the historical data in the first modality into a first neural network to generate a first output. The method can include one or more processors inputting the historical data in the second modality into a second neural network to generate a second output. The method can include one or more processors inputting the historical data in the third modality into a third neural network to generate a third output. The method can include one or more processors concatenating the first output, the second output and the third output to generate a concatenated output. The method can include one or more processors inputting the concatenated output into a fourth neural network to generate the predetermined representation for the entity.

The method can include one or more processors inputting the data into the distance model to generate the representation. The method can include one or more processors identifying a first historical representation based on a first data sample of the historical data input into the distance model. The method can include one or more processors identifying a second historical representation based on a second data sample of the historical data input into the distance model. The method can include one or more processors identifying a third historical representation based on a third data sample of the historical data input into the distance model. The method can include one or more processors determining a first distance between the representation and the first historical representation. The method can include one or more processors determining a second distance between the representation and the second historical representation. The method can include one or more processors determining a third distance between the representation and the third historical representation. The method can include one or more processors aggregating the first distance, the second distance and the third distance to determine the distance.

At least one aspect of this technical solution is directed to a system to manage a session accessed by a client device. The system can include one or more processors and memory. The system can receive data in a plurality of modalities corresponding to a plurality of features of a session for an entity accessed by a client device. The system can determine, based at least in part on the data of the session for the entity and a distance model trained with historical data of the entity that accounts for cross-modal correlations between the plurality of modalities, a distance between a representation of the data of the session and a predetermined representation for the entity established based on the historical data for the entity. The system can compare the distance with a threshold established for the entity. The system can generate, based at least in part on the comparison between the distance with the threshold, an action to manage access by the client device to the session for the entity.

The system can identify that the session is provided by a cloud storage service hosted by one or more servers, and the one or more processors are intermediary to the client device and the one or more servers. The plurality of modalities can comprise at least one of numeric data, categorical data, image data, sound data, a sequence of data, or a combination of at least two of the plurality of modalities. The plurality of features can comprise at least one of a number of files downloaded, a file type, a file size, a download duration, a location of the client device, a timestamp, a download volume over a predetermined time interval, or a sequence of electronic remote procedure calls.

The system can access a data repository storing a plurality of distance models corresponding to a plurality of entities. The system can select, from the data repository, the distance model for the entity from the plurality of distance models. The system can establish the threshold for the entity based on a distribution of pairwise distances between representations output by a model trained for the entity based on the historical data. The system can determine, based at least in part on the comparison, that the distance is greater than the threshold. The system can select, responsive to the distance greater than the threshold, the action based at least in part on a security policy associated with the session, the action comprising at least one of: a request for multifactor authentication, terminating the session, locking an account of the entity to prevent subsequent access to the session, or transmitting a push notification to one or more client devices associated with the entity.

The system can determine that the distance is greater than each of the entity threshold, the global threshold and the peer threshold. The threshold can comprise an entity threshold, a global threshold, and a peer threshold. The system can flag, responsive to the distance being greater than each of the entity threshold, the global threshold and the peer threshold, the session as malicious.

The system can determine that the distance is greater than zero and less than the threshold for the entity. The system can allow, responsive to the determination, access by the client device to the session for the entity. The system can train the distance model with the historical data for one or more entities using a distance-based loss function configured to predict relative distances between inputs for the one or more entities.

The historical data for the entity can comprise a first modality of the plurality of modalities, a second modality of the plurality of modalities, and a third modality of the plurality of modalities. The system can input the historical data in the first modality into a first neural network to generate a first output. The system can input the historical data in the second modality into a second neural network to generate a second output. The system can input the historical data in the third modality into a third neural network to generate a third output. The system can concatenate the first output, the second output and the third output to generate a concatenated output. The system can input the concatenated output into a fourth neural network to generate the predetermined representation for the entity.

The system can input the data into the distance model to generate the representation. The system can identify a first historical representation based on a first data sample of the historical data input into the distance model. The system can identify a second historical representation based on a second data sample of the historical data input into the distance model. The system can identify a third historical representation based on a third data sample of the historical data input into the distance model. The system can determine a first distance between the representation and the first historical representation. The system can determine a second distance between the representation and the second historical representation. The system can determine a third distance between the representation and the third historical representation. The system can aggregate the first distance, the second distance and the third distance to determine the distance.

At least one aspect is directed to a non-transitory computer-readable medium comprising processor executable instructions that, when executed by at least one processor, cause the at least one processor to manage a session accessed by a client device. The instructions can include instructions to receive data in a plurality of modalities corresponding to a plurality of features of the session for an entity accessed by the client device. The instructions can include instructions to determine, based at least in part on the data of the session for the entity and a distance model trained with historical data of the entity that accounts for cross-modal correlations between the plurality of modalities, a distance between a representation corresponding to the data of the session and a predetermined representation for the entity established based on the historical data for the entity. The instructions can include instructions to compare the distance with a threshold established for the entity. The instructions can include instructions to generate, based at least in part on the comparison between the distance with the threshold, an action to manage access by the client device to the session for the entity.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 4C is a flow diagram of an example method for binary classification, in accordance with an implementation;

DETAILED DESCRIPTION

Figure 1:
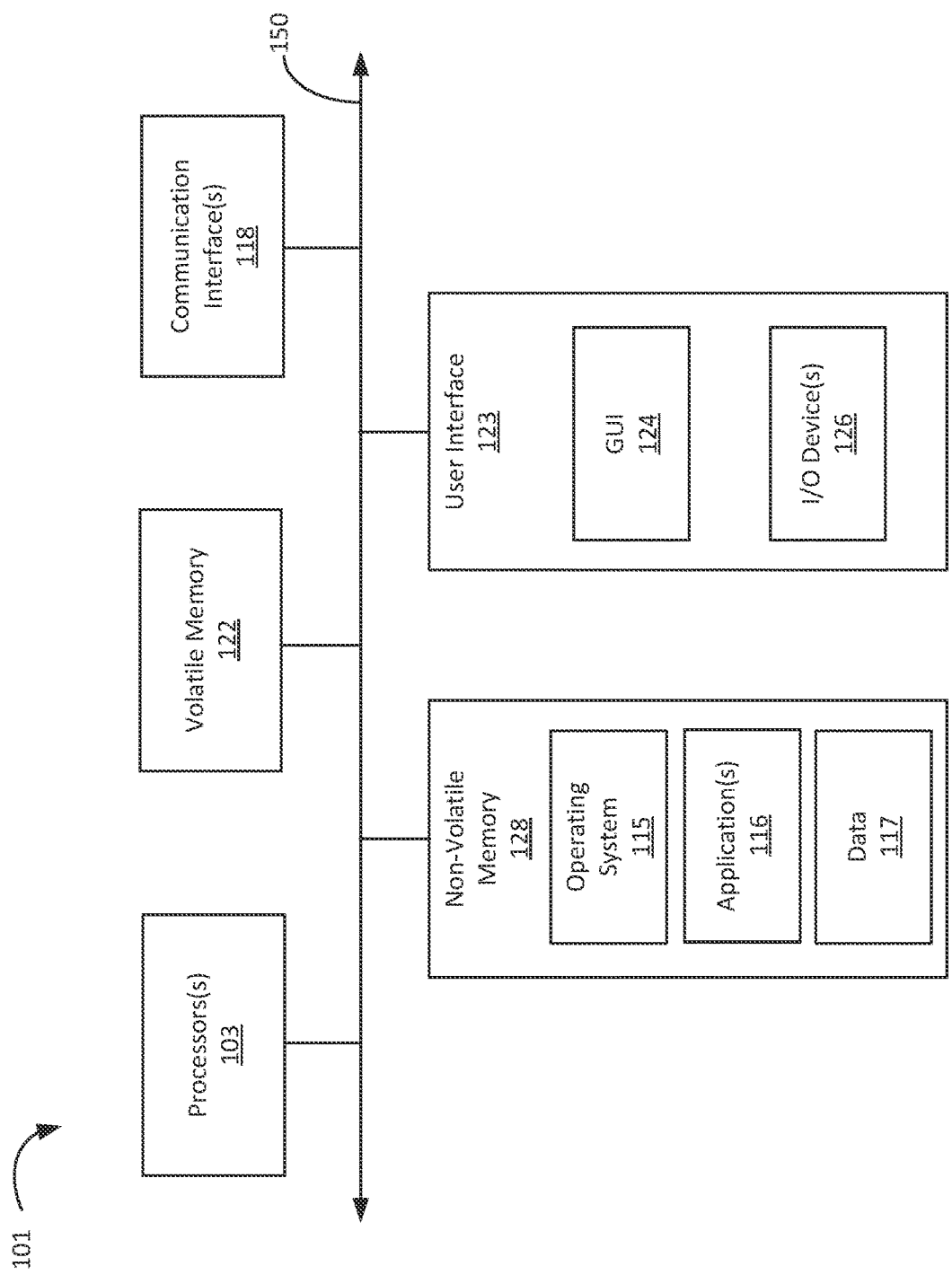
FIG. 1 is a block diagram of embodiments of a computing device.

This technical solution provides systems, methods, and apparatus for contextual access control. Due to differences in users or entities behaviors when accessing a session of an application, there are significant challenges to secure session access from the users or the entities that may be of potential threats or security risks, e.g., compromised accounts, data exfiltration, or insider threats. In particular, differences in behaviors may or may not reflect potential threats or security risks based on the activities of the account owner. By using unsupervised analytics, false positives or false negatives reports may often occur due to various deviated actions of the users or the entities from their routines. Therefore, when attempting to secure sessions using unsupervised analytics, cases of false reports of security breaches or non-reported threats may occur.

The systems, methods, and apparatus can include a user and entity behavior analytics ("UEBA") system. The UEBA system can collect and analyze user behavior or entity behavior information. The UEBA system can apply statistical analysis or machine learning to detect potential threats, risks, or other scenarios that can indicate an anomaly (e.g. compromised accounts, data exfiltration, insider threats). The UEBA system can analyze one or more combinations of features to determine a representation of the user. This representation can refer to the behavior of the user which can deviate from the common path that the account owner follows. The features used by the UEBA system can be analyzed in combination rather than individually or separately to determine a representation of user behavior. In some cases, the UEBA system of the present disclosure can utilize features and functionalities of other UEBA systems. For example, the UEBA system can utilize unsupervised anomaly detection techniques. The UEBA systems can perform their features and functionalities in conjunction with rule based-approaches or signature based-approaches system to improve the security posture of an organization.

The UEBA system of the present disclosure can provide the notion of distance between the current user behaviors and the common paths (e.g., expected behavior or historical sequence of events performed by the user) to improve the security of the account, the devices accessing the session, and the organization. Furthermore, this UEBA system can enable other possibilities. For example, for users that deviate slightly from the common paths (e.g., follow a path that is outside the common path but it is still very close to it), the UEBA system may not alert an administrator of an application session. In other words, due to the small distance of deviation from at least one of the common paths, this may not indicate a potential threat or security risk. Identifying slight deviations from the common path as suspicious behavior may result in false positives or excessive alerts or denials of access, which can waste computing resources and introduce delays and wasted network and processor utilization. Accordingly, the improved UEBA system can determine the distance between the current user behavior and the corresponding common path of the user (e.g., compare the current data with historical data associated with or related to the user) to neglect small deviation as suspicious activities, while notifying the administrator of security risk upon detection of large deviation from the common path. The UEBA system can therefore improve rates of false positives or false negatives, improve detection of security risks, and reduce fraudulent users from accessing a session.

The UEBA system of this disclosure can personalize a distance of deviation specific to each user. For example, some users can follow a certain path consistently while others may use several different paths when interacting with the system (e.g., in different sessions). In the case of consistent users, for example, the UEBA system can determine that a slight deviation from their common path may indicate suspicious behavior. In another example, in the case of non-consistent users, the UEBA system can determine that the slight deviation from their common path may not indicate suspicious behavior. Even with non-consistent users, patterns can be generated from their behavioral data collected over time. Therefore, non-consistent users can diverge further from their common paths (e.g., in comparison to consistent users) to trigger suspicious behaviors. Hence, with the UEBA system that uses multivariate approaches, past user behaviors (e.g., historical data or previously recorded events of the user within one or more sessions) can be leveraged to calculate personalized accepted deviations (e.g. thresholds) to improve the accuracy for identifying security threats based on behaviors of individuals and their interaction with the system.

For purposes of reading the description of the various embodiments below, the following descriptions of the sections of the specification and their respective contents may be helpful:

Section A describes a computing environment which may be useful for practicing embodiments described herein; and Section B describes systems and methods for session access management.

A. Computing Environment

Prior to discussing the specifics of embodiments of the systems and methods for contextual access control, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, FL, the teachings of which are hereby incorporated herein by reference.

B. Systems and Methods for Session Access Management

The UEBA system can manage the security of an organization. However, using certain security mechanisms, such as unsupervised anomaly detection, an assumption may be made that, under normal circumstances, behaviors of users or entities are consistent throughout a session. For example, the behaviors of the users or the entities can include the time spent in a session, logged web navigation or searches, or types of content viewed. In other words, the UEBA system with unsupervised anomaly detection may assume that the users or the entities may follow certain paths within a session without any deviation. Hence, once the users or the entities deviates from the path, this UEBA system may notify a potential risk to an administrator of the session (e.g., the organization managing the application that generated the session).

This disclosure is directed towards systems, methods, and apparatus for managing a session accessed by a client device. By utilizing implementations of a management system as discussed herein, similarities and differences between behaviors of a given user or entity in a current session compared to their historical sessions can be identified, thereby improving session security and anomaly detection of the UEBA system. The management system can utilize a UEBA system for anomaly detection via distance metric learning. The aforementioned UEBA system can utilize the features and functionalities of the unsupervised UEBA system. For example, a distance between current behavior and historical behaviors of the user (e.g., previously recorded events, actions, or behaviors of the user) can be determined. The behaviors can include, for example, at least user interactions within the session, a sequence of user locations accessing the session, network connection data, or total file size downloaded in the session. The session may be accessed using one or more devices, such as a laptop, a mobile device, a tablet, or a desktop. The devices can be connected to a network connection to access the session, such as a home Ethernet, hotspot, work network platform, LTE, or public Wi-Fi. Upon a device accessing a session via one of the network connection, the management system can enhance the security level and anomaly detection by calculating a distance between combinations of current user behaviors that diverges from the historical user data (e.g., past events, behaviors, path, and actions performed by the user). Therefore, the management system can notify the organization of a security risk when the distance between the current behavior and the historical behavior is greater than a threshold (e.g., predetermined globally or individualized to each user or entity).

The systems, methods, and apparatus can improve on the unsupervised anomaly detection perspective and other detection perspectives for managing session access by users or entities. Anomaly detection may be referred to as a set of techniques that identify unusual patterns, not conforming to expected behavior, such as outliers. In other words, by using unsupervised UEBA, any suspicious behavior that falls outside the most common or expected paths can be marked and notified to an organization managing the session. However, by utilizing the management system as previously discussed, instead of reporting any suspicious behavior, the improved UEBA system (e.g., referred to generally as UEBA system hereinafter) can determine a distance from the common path (e.g., behavior, action, or expected events) embarked by the users or the entities. Depending on the distance from the expected path as compared to a threshold, which can be personalized to a user or an entity, the UEBA system can report a security risk or determine that the account owner is accessing the session. The account owner can refer to a user or an entity that is expected to be utilizing the session. For example, prior to obtaining access to the session, the user can log in to an account. Based on the account accessing the session, the UEBA system can compare the expected behavior associated with the account (e.g., based on historical data) to the current behavior of the user. The UEBA system can extract features of the behaviors for embedding into a representation of a user (e.g., features and characteristics that can be used to determine the identity of the user). The representation can be generated after a predetermined period of time, such as every hour for comparison with the common path of the user. Therefore, the UEBA can compute the distance between each user and their common paths to improve the security of the session, the account, and the organization.

Figure 2:
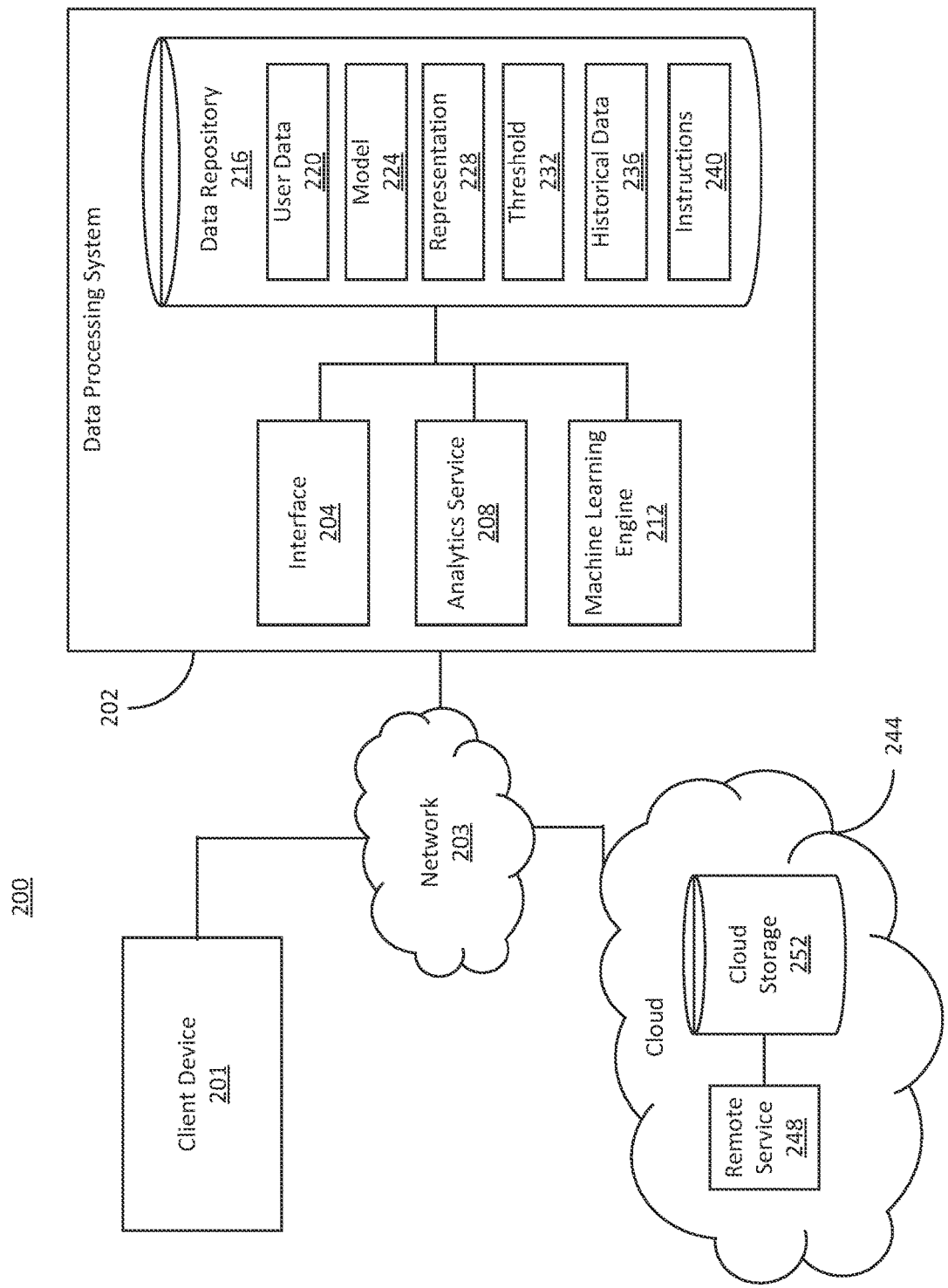
FIG. 2 is a block diagram of an example system to manage session access, in accordance with an implementation.

Referring to FIG. 2, depicted is a block diagram of one embodiment of a system 200 for managing a session accessed by a client device. The system 200 can include a client device 201, a data processing system ("DPS") 202, a network 203, and a cloud 244. The network 203 can provide a connection between the client device 201, the DPS 202, and the cloud 244. The client device 201 may be referred to as a user device, a computing device, or a personal device. The DPS 202 may be referred to as a UEBA system, an intermediary device that is intermediary to client devices and one or more servers, a session management system, a server (e.g., application server or web server), or an anomaly detection device. The cloud 244 may be referred to as a cloud computing device, a second server, or a remote computing device. The client device 201, the DPS 202, and the cloud 244 can include one or more hardware components or a combination of hardware and software in connection with FIG. 1. The client device 201, the DPS 202, and the cloud 244 can include one or more processors and one or more memory storage. The one or more hardware components, or the combination of hardware and software, can perform or operate one or more features and functionalities similar to one or more elements or components in connection with FIG. 1. The client device 201 can include any application, program, library, script, task, service, process, or any type and form of executable instructions executing on the hardware of a client device 201 (e.g., the client applications). The DPS 202 can include any application, program, library, script, task, service, process, or any type and form of executable instructions executing on the hardware of the DPS 202. The cloud 244 can include similar hardware, software, and other components similar to the DPS 202. The hardware can include circuitry such as one or more processors in one or more embodiments. Hardware components can be in electrical communication with one or more other hardware components. The system 200 can include multiple similar components, such as multiple client devices, data processing systems, or cloud processing systems.

The client device 201 can be any personal device, such as a mobile device, a laptop, desktop computer, or a tablet. The client device 201 can record location information to indicate the home location, the work location, or other locations the user may visit with the client device 201 (e.g., potentially using the client device 201). The user can be referred to as an entity, an employee, personnel, or an operator of a device. The client device 201 can transmit other recorded data to the DPS 202, such as historical download data or upload data. These data can indicate file size per download, a number of files downloaded, or uploaded file size, for example. The client device 201 can receive notifications from the DPS 202 or a server, such as a cloud storage server or an application server. The client device 201 can receive inputs from the user. For example, the client device 201 can receive a request for credentials to identify the identity of a user. The client device 201 can receive inputs from the user to respond to the request for credentials.

The client device 201 can include a client application installed or operating on the client device 201. The client device 201 can include an embedded browser that can render the information of a network application accessed via the client application. The client device 201 can be used by a user to request a session from a server (e.g., an application server or the DPS 202). The client device 201 can receive a session identifier ("ID") for accessing a session. A communication channel can be established between the client device 201 and the application via the session. The application can include email programs, file transfer port, terminal emulation, and other applications of a computer network. The client device 201 can transmit or receive data packets to/from the server or the DPS 202 via the network 203. The client device 201 can transmit data (e.g., in the form of data packages), for example, including location data, network connection data, hardware log information, locally stored information, and other data collected by the client device 201 or input by the user, among others. The network connection data can include a connection type to access the network 203, such as free public network Wi-Fi, Long-Term Evolution ("LTE") network, office network, home Ethernet, or other network connections. The hardware log information can include any device information within the terms and conditions of the application server to access a session. For example, the hardware log information can include cache data, storage space, memory size, the processor in the client device 201, operating system, screen time, or other logged user activities. The location of the client device 201 can indicate the location of the user accessing a session.

The client device 201 can be signed-in to an account to access an application via a session. The client device 201 can be prompted to signup, to access the application. The client device 201 can receive inputs from the user in an attempt to signed-in. In some cases, the client device 201 can access a session without signing into an account. The client device 201 can be a guest of the application.

The network 203 can provide a communication channel between the client device 201 and the DPS 202. The network 203 can provide a connection between an application of the client device 201 to the DPS 202. The network 203 can provide other communication channels and connections between the client device 201, the DPS 202, and other components within the system 200, such as the cloud 244. The network 203 can facilitate a session of an application running on the client device 201 to transmit to or receive data from the DPS 202. For example, the network 201 can transmit or receive data packages between an application server and the client device 201, the application server and the DPS 202, or the DPS 202 and the client device 201. The data package (e.g., data packet) can include, for example, a header, a payload, and a trailer.

The network 203 can represent a channel between the client device 201 and the DPS 202. The channel can include multiple layers, such as an application layer, presentation layer, and other layers to provide data flow. For example, the network 203 can compress, reformat, convert, or otherwise forward the data packages from a device to another. There can be multiple networks for establishing channels between multiple devices and servers. In some cases, the network 203 can provide one or more communications channels between the client device 201 and one or more devices for intercommunication. The network 203 can relay a data package to a destination indicated in the data package.

The DPS 202 can include an interface 204, an analytics service 208 (e.g., analytics system or analytics device), a machine learning engine 212, and a data repository 216. The DPS 202 can be an intermediary device between the client device 201 and a server, such as an application server. In some cases, the DPS 202 can be a part of the server. In some cases, the DPS 202 can be one of the servers to provide a session to the client device 201 via the interface 204 connected to the network 203. The interface 204 of the DPS 202 can include one or more interfaces to provide the client device 201 with access to a computer network such as a Local Area Network (LAN), a Wide Area Network (WAN), a Personal Area Network (PAN), or the Internet through a variety of wired and/or wireless or cellular connections. The interface 204 can include one or more features and functionalities in connection with the user interface 123 or the communication interface 118 of FIG. 1. The interface 204 can provide electrical communication between one or more components of the DPS 202, such as the analytics service 208, the machine learning engine 212, and the data repository 216. The interface 204 can establish a link with the network 203 to connect the DPS 202 to the client device 201. The interface 204 can establish a link with one or more servers to relay information to or from the client device 201, such as a request to access a session, session ID, or credentials from the client device 201. The credentials can include any options to verify the user identity, such as a username and password, multi-factor authorization, email confirmation, push confirmation, pin code, or automated voice call.

The analytics service 208 of the DPS 202 can include at least one of the features and functionalities of other UEBA systems, such as features from univariate anomaly detection algorithms. The analytics service 208 can analyze each metric or feature independently from other metrics. The metrics can include locations of the client device 201, the number of files download or upload, size of each file downloaded or uploaded, among others. Using the univariate anomaly detection, the analytics service 208 can detect anomalous activities separately for each metric, for example. For example, the analytics service 208 of the DPS 202 can consider any possible correlations between the various metrics, such as location and download size, location and upload size, network connection and browser searches, and so forth.

The analytics service 208 can process sequences of categorical events to determine user behaviors. The sequences of categorical events can indicate the historical patterns of the user. For example, the analytics service 208 can receive location data and network connection data of the client device 201 as an input feature. The device owner may not commonly use public Wi-Fi, for example. The analytics service 208 can process sequences of event types produced by the user, such as file download, file upload, folder delete, or folder created within a session. The analytics service 208 can determine the user behavior is unusual based on a comparison with the user historical patterns. For instance, the analytics service 208 can use a historical sequence of locations to detect whether the current location of the user (e.g., corresponding to the location of the client device 201) is expected or not. If the location is not expected, such as in view of other features or data received from the client device 201, the analytics service 208 can determine that user behavior is suspicious.

The analytics service 208 can be assisted with statistical or machine learning models to detect anomalies in the numeric data, the sequential data, or other data modality. The analytics service 208 can use the correlations that exist between different modalities to determine which user is suspicious. For example, based on historically or past collected data from the client device 201, the analytics service 208 can determine that the user may not access the application during most days unless when the user work from home (e.g., other locations different from the work location). In other words, the analytics service 208 can determine that the user does not access the session unless when working remotely, for example, to retrieve data they have saved in the past. The correlation between sequential data (e.g., a sequence of locations in this case) and numeric data (e.g., number of file downloads in this case) of the user can be analyzed by the analytics service 208, and other components of the DPS 202 including the machine learning engine 212.

For example, the analytics service 208 can receive sequence data and numeric data from a different device accessing the application. In this case, the analytics service 208 can determine that this device is at a location different from the past locations visited by the user. Furthermore, for example, the analytics service 208 can receive sequence data from the client device 201 indicating that the user is a work location. Therefore, by analyzing the data of the devices mentioned, the analytics service 208 can determine a suspicious behavior from the user of the different device, which may be a security risk to the organization. The analytics service 208 can then notify the organization of the threats, including the location of the suspicious device accessing the application and files that the device attempts to download or upload. Before further instructions, the analytics service 208 can suspend the session of the suspicious device responsive to determine the suspicious behaviors (e.g., within seconds, upon suspicion, before the download is completed, or before a file is uploaded onto the server).

Interactions between devices and a session of an application can refer to an interaction between the devices and the server. For example, events or activities occurring in the session may interfere with the performance of the server. Furthermore, files or scripts uploaded in the session can be directly uploaded to the server. The DPS 202 can prevent malicious behavior from interfering with the server. The DPS 202 can prevent leakage of information due to unauthorized personnel or users downloading files from the server that they otherwise would not be able to.

The DPS 202 can handle multimodal data in a single model. The DPS 202 can be a multivariate system. The model can leverage the cross-modal correlations and can be optimized end-to-end to provide accurate distance estimations, taking into account all the multimodal features extracted from devices. The DPS 202 can produce personalized thresholds for each user. For example, using at least the analytics service 208 and the machine learning engine 212, the DPS 202 can combine different modalities of input data (e.g., both numeric and sequential data or any other possible data modality) into a single model that is optimized end-to-end. The DPS 202 can exploit all the correlations among all input features (e.g., across all modalities) while still being interpretable. The DPS 202 can utilize a distance learning perspective, among other UEBA systems, as previously discussed. The DPS 202 can produce data-driven, personalized alerting thresholds for each user based on the consistency of past user behaviors. The DPS 202 can be optimized to perform at least the abovementioned features to improve the security of the organization, prevent data breaches, protect users from malicious software and intentions by other users, and increase the accuracy of identifying suspicious events.

In further details from the above, the analytics service 208 can include a distance calculation to determine how far the behavior of the current user (e.g., data from current session) is compared to the behavior of the previous user (e.g., data from historical sessions). The behavior of the previous user can be from the same user. The behavior of the previous user can be from different users. The analytics service 208 can calculate a different distance for each user or each session used by any user. For example, different sessions can be used by the same user, but the analytics service 208 may not calculate the same distance for each session. In some cases, different sessions can be used by different users, but the analytics service 208 can determine that the distances of the different users are not suspicious for the organization (e.g., the distances are below a threshold). In some cases, the analytics service 208 can determine that a user is suspicious within a session, for example, based on an increase in distance from one hour to another during the session accessed. By calculating a distance, instead of labeling every behavior that falls off the common path as suspicious, the DPS 202 can increase the accuracy of identifying suspicious users, reduce false positives and false negatives within the deduction, and improve the security of the organization managing the session.

The analytics service 208 can compare a distance to a threshold to determine whether the behavior or the representation of the user falls within a common path or is far from the common path (e.g., indicating that the user is not the account owner or the device owner). The threshold can be higher or lower based on the consistency of past user behavior. For example, if the threshold is lower, the analytics service 208 can be more sensitive (e.g., determine suspicious behavior) towards any activities that are outside the common path. The threshold can be any numeric or range of values, such as 0.1 to 1, 0% to 60%, or between 1:10 to 10:10. The list of thresholds associated with each device, including the client device 201, can be stored in threshold storage 232 of the data repository 216.

The analytics service 208 can compare the current distance to a threshold or a historical distance to determine if the current user is suspicious. For example, the analytics service 208 can calculate whether the current distance is greater than the threshold. The analytics service 208 can subtract the current distance by the threshold, for example. If the result is negative, the analytics service 208 can determine that the user is suspicious and report to the organization. The opposite is true, where positive results can indicate suspicious behavior and negative results can indicate that the user is following the common path, depending on the calculation process. The analytics service 208 can perform further action depending on the configuration of the organization on how suspicious behaviors can be handled (e.g., lock the account, terminate the session, or transmit additional request for credentials). The threshold can be calculated historical dataset received from the client device 201. The historical dataset can refer to a threshold dataset.

The machine learning engine 212 can train a model to generate or determine one or more representations of user patterns. Each representation can correspond to a feature extracted from a verified user data (e.g., user that are not suspicious). The machine learning engine 212 can generate a trained model using user data collected from one or more devices of the user. The one or more devices can include the client device 201. For example, the machine learning engine 212 can receive a training dataset. The machine learning engine 212 can receive the training dataset from a server creating sessions for devices. The DPS 202 can be an intermediary device between the client device 201 and the server to monitor user behavior during a session created by the server. The server can be managed by an organization that when suspicious behavior is identified, the DPS 202 can notify the organization accordingly. The training dataset can be dataset from at least one device of the account owner or the device owner (e.g., known user that is authorized to access the session or other files within the server). The training dataset can be from a historical data storage 236. For example, the historical data storage 236 can store data associated with the account owner, the device owner, an administrator of the application, or other users that are authorized to access the session and information within the session. The user data storage 220 can store current data from a user of a device accessing the session, where the DPS 202 is determining whether the user is suspicious or not.

The machine learning engine 212 can extract features from the training dataset. The machine learning engine 212 can extract the features from the training dataset using one or more feature extraction techniques. The features can refer to metrics to identify sequences data or numeric data of a user. Each type of features can be grouped into a data sample. For example, the features can be grouped to a sequence of locations, numeric file configuration data (e.g., upload or download size), a sequence of searches (e.g., browser search or file search in local device storage), duration of session access (e.g., per day or week), among others. The machine learning engine 212 can group other data for training purposes.

The machine learning engine 212 can generate a trained model or train an existing model using at least one Neural Network. The extracted features of the training data can be used as input to the Neural Network. For example, the machine learning engine 212 can utilize Triplet Neural Network ("TNN") or Siamese Neural Network ("SNN") to train a model for determining representations of the features of the user. The machine learning engine 212 can utilize loss functions, such as a contrastive loss or the triplet loss. The contrastive loss can lead to the creation of SNNs while the triplet loss can lead to the creation of TNNs. The machine learning engine 212 can utilize other Neural Networks and functions to train a model.

The difference in using TNN or SNN can be how the model parameters are optimized to generate the representations of the user. The difference between each Neural Network can be depicted in FIGS. 5B and 5C, for example. For example, the SNN can compare pairs of inputs and the TNN can leverage relative distance to determine one or more rankings between data samples.

Using TNNs, for example, the machine learning engine 212 can provide three data samples as input each time. A first sample can be an anchor sample, a second input can be a positive sample, and a third sample can be a negative sample. The anchor sample and the positive sample can be from the same user authorized to access the session. The negative sample can be from a different user which may not be authorized to access the session, thus, can have a different pattern than the authorized user. The machine learning engine 212 can feed each sample to a base network to output a representation for each sample. In this case, there can be three representations, e.g., a first representation for the anchor sample, a second representation for the positive sample, and a third representation for the negative sample. In some cases, the machine learning engine 212 can use more than three data samples (e.g., more than one of anchor sample, positive sample, or negative sample), such as to generate more than three representations.

The machine learning engine 212 can calculate the distance (e.g., Euclidean) between each combination. For example, the machine learning engine 212 can calculate a first distance between the anchor representation (e.g., the first representation) and the positive representation (e.g., the second representation), a second distance between the anchor representation and the negative representation (e.g., the third representation), and a third distance between the positive representation and the negative representation. The machine learning engine 212 can calculate additional distances between other representations based on the input samples. The machine learning engine 212 can attempt to minimize the distance between the anchor representation and the positive representation. The machine learning engine 212 can maximize the distance between the anchor representation and the negative representation. In some cases, the machine learning engine 212 can also maximize the distance between the positive representation and the negative representation. In some cases, the anchor representation can correspond to the positive representation, similar in distances when compared to the negative representation.

For example, the machine learning engine 212 can use the loss function for triplet loss, in this case, using Euclidean distance:

$$L(A,P,N)=\max(|f(A)-f(P)|^2-|f(A)-f(N)|^2+a,0)$$

The A can represent an anchor sample, P can represent the positive sample of the same class as A, and N can represent the negative sample of a different class from A, for example. In some cases, the anchor sample can be swapped with the positive sample. The alpha can be a margin between the positive and the negative pairs. The f can be the base network that produces the embeddings. The function of the margin can be, for example, when the representations produced for a negative pair are distant to a satisfactory level (e.g., more than a predetermined value or percentage, such as 0.3 or 30%), the distance between the negative and the anchor may not be enlarged, for example. Accordingly, the machine learning engine 212 can focus on training more difficult pairs in this case. Dynamic margins can be used to determine the distance between each pair of representations. In further example, if multiple samples are given (e.g. a batch of samples), the overall cost function can be the sum of losses for all triplet samples belonging to the batch. This cost function can be used for the minimization of the posed optimization problem.

For example, the above triplet loss cost function can encourage the base network (e.g., and all its constituent neural sub-networks) to learn useful parameters. The base network can update its internal parameters in order to minimize the above cost function when fed with data triplets. All intermediate representations can be jointly optimized to achieve the goal of minimizing the distance between data samples of the same users and maximize the distance of samples from different users. The Neural Networks can jointly optimize the representation of the input data, for example, conditioned on the similarity measure being used. Thus, the Neural Network can provide end-to-end deep metric learning.

The machine learning engine 212 can determine which data samples to select, for example, as an anchor sample, a positive sample, and a negative sample. The DPS 202 can determine subtle differences between all users. The machine learning engine can select the data samples based on three categories of triplets (e.g., "d" can denote the Euclidean distance between two samples). The three categories of triplets can include easy triplets, hard triplets, and semi-hard triplets. For example, the easy triplets can include a loss of 0 (e.g., using the loss function above; d(A, P)+margin<d(A, N)). The hard triplets can include triplets where the negative is closer to the anchor than the positive, e.g., d(A, N)<d(A, P). The semi-hard triplets can include triplets where the negative is not closer to the anchor than the positive, but still have a positive loss, e.g., d(A, P)<d(A, N)<d(A, P)+margin. The DPS 202 can select a random semi-hard negative sample for every pair of anchor and positive. The machine learning engine 212 can train the model based on the selected triplets. Other combinations of selection can be perform aside from the aforementioned process and method. In some cases, the machine learning engine can randomly select an anchor sample from a first cluster of data samples verified to be the same user, randomly select a positive sample from the first cluster, and randomly select a negative sample from a second cluster of data samples from different users. The model used by components of the system 200 or trained by the machine learning engine 212 can be stored in a model storage 224.

At least one feature of the machine learning engine 212 can be performed by the analytics service 208, such as to determine a representation of an extracted feature or determining a distance between each pair of representations. At least one feature of the analytics service 208 can be performed by the machine learning engine 212. In some cases, the analytics service 208 can be used for inferencing data output by the machine learning engine 212. For example, the machine learning engine can determine the distance between the representations and the threshold of the previous user (e.g., a threshold of the session, the application, or the device belonging to the previous user). The analytics service 208 can compare the distance with the threshold to identify suspicious users and report to an administrator of an application or an organization. Features and functionalities of the analytics service 208 and the machine learning engine 212 can be described in further detail and examples herein, and at least at FIGS. 4-12, for example.

The DPS 202 can calculate a threshold for comparison with a distance of a current user. The threshold can be personalized to a user. In some cases, the threshold can be used globally among all users or within a group of users (e.g., peers of the user). The analytics service 208 can input data samples to a trained model to determine representations of the user of the client device 201. The data samples can be different from the dataset used to train the model. By using different data samples, the DPS 202 can identify how much tolerance to allow for the user (e.g., based on the user consistency during sessions). Each representation may be presented as a numerical value, such as 0.5, 0.7, or 0.9. With the representations, the machine learning engine 212 can calculate all pairwise distances between the representations of the user. In some cases, the analytics service 208 can perform the calculation of the distance, with representations provided by the machine learning engine 212. In some other cases, the machine learning engine 212 can perform the calculation to determine, for example, the data samples, the representations, and pairwise distances.

For example, the DPS 202 can receive a threshold dataset from the client device 201. The threshold dataset can refer to raw data from the client device 201 to calculate a personalized threshold for the user operating the client device 201. The machine learning engine 212 can extract features from the threshold dataset to determine one or more data samples. These data samples can include different locations traveled by the user, file download or upload by the user, and content browsed during a timeframe in the session (e.g., 1 hour, 2 hours, or 30 minutes). In some cases, the features to extract can be predetermined based on the type of features used to train a model. For example, if the machine learning engine 212 use location, file size, and a number of files downloaded as features to train the model, the features extracted from the threshold dataset can include location metric, file size metric, and a number of files downloaded metric.

The machine learning engine 212 can train a model configured to receive data samples from the analytics service 208. The machine learning engine 212 can receive the data samples to determine representations of the user. For example, the machine learning engine 212 can input each data sample into the model. The machine learning engine 212 can compare each data sample to one or more corresponding trained samples of the same type (e.g., same feature or metric). The machine learning engine 212 can output a representation for each data sample input into the model. Each representation can correspond to each data sample, such as a location representation, a file management representation, and a browsing representation of the user. The representations can include a numeric interpretation of differences between the input features and corresponding features of the same user to determine the consistency of the user path or behavior.

The machine learning engine 212 can compare or calculate the distances between the representations. For example, with three data samples, the machine learning engine 212 can use a trained model to generate three corresponding representations (e.g., a first representation, a second representation, and a third representation). The analytics service 208 can compare the first representation to the second representation, the second representation to the third representation, and the first representation to the third representation. Based on the comparison, the analytics service can determine a first distance, a second distance, and a third distance corresponding to the aforementioned pairs of compared representations. The analytics service 208 can aggregate the distances to determine a distance threshold for the user (e.g., mean, max, or min value). In some cases, the analytics service 208 can relay the distances to the machine learning engine 212 to aggregate the distances. The analytics service 208 can use the threshold to determine if a current user is suspicious or have malicious intent. If suspicious, the analytics service 208 can notify the organization.

The DPS 202 can use the machine learning engine 212 to identify suspicious users to report to an administrator of an application. For example, the DPS 202 can receive new data from the client device 201. The new data can be from multiple devices, and the DPS 202 can process information for each user in parallel. The new data may refer to the current data from the client device 201, such as within the past 1 hour. The machine learning engine 212 can calculate or determine features within the new data. The calculated features can include location data, search query data, network connection data, cookie data, among others. The machine learning engine 212 can train a model for generating representations from input features. The model can be respective to the account owner of the session. In other words, the model can be trained using historical data of the expected user. Using the trained model, the machine learning engine 212 can determine current representations (e.g., each can be a representation of a feature) of the user that is using the client device 201. The machine learning engine 212 can compare the current representations of the user to historical representations of corresponding features.

In some cases, the machine learning engine 212 can determine a single representation with various combinations of features. For example, the machine learning engine 212 can aggregate a first feature, a second feature, and a third feature into a data sample. The machine learning engine 212 can input this data sample into a model trained using similar types of the first feature, the second feature, and the third feature from a training dataset. Therefore, the machine learning engine 212 can output a single representation of the current user for comparison with other historical representations.

The machine learning engine 212 can compare the current representations of the current user to multiple historical representations of the previous user. The historical representations may not be determined from the same data sample as used to train the model. In some cases, the historical representations are determined from the training dataset of the model. The machine learning engine 212 can output corresponding distances for each historical representation comparison. The output from the machine learning engine 212 can be passed to the analytics service 208, where the distances can be aggregated.

The DPS 202 can include a workspace for executing one or more applications on the DPS 202. The application can create a session for the client device 201 to access upon receipt of a successful response to a request for credentials. In this case, the DPS 202 can create and monitor a session accessed by the client device 201. The DPS 202 can restrict access to the session to users that the DPS 202 determines to be of security risk to the application. This determination is based on the distance of the user behavior from the normal path of the client device 201.

The behavior of each user can be consistent or non-consistent to their past behaviors when accessing one or more sessions. For example, users with consistent behavior may perform similar actions throughout their sessions, such as web browsing, file download, file upload, or a number of files downloaded. In further example, consistent users can access an application at similar locations, including at home, at work, in a restaurant, or in a coffee shop. These actions can be in a similar sequence of events or any order desired by a respective user. An example of a user with consistent behavior can include an employee reviewing documents or websites at different locations, for example, the employee can review the documents at home or at the work location while navigating through different articles in a restaurant or at a coffee shop. The location and types of content accessed during the session can be separate features of user behavior. The machine learning engine 212 of the DPS 202 can analyze these features alone or in any combination to determine a representation of a user (e.g., what characteristics or combinations of characteristics define who the user is).

Using the analytics service 208 and the machine learning engine 212, the DPS 202 can detect, identify, or determine the suspicious behavior of the user. For example, the client device 201 may be located in a different location than the normal path (e.g., home, work, restaurants, or coffee shops), such as a public area (e.g., connecting to a free public Wi-Fi without password protection). While in this location, a user using the client device 201 may attempt to download files and folders not typical of the behavior of the employee according to the location. Therefore, the analytics service 208 DPS 202 can terminate the session accessed by the client device 201 and notify the organization of potential threats. To determine the suspicious behavior, the machine learning engine 212 can compare a current representation of the user to a historical representation. In the case that the application is restricted for access by employees, the historical representation can be the employee behavior representation. On the other hand, the user and the employee in this case can be one of the same. Prior to terminating the session, the analytics service 208 can transmit a request to reconfirm the identity of the user (e.g., multi-factor authentication, Face-ID, or other identification techniques). Upon receipt of a successful response to the request, the DPS 202 may not terminate the session. If a response is not received within a time frame (e.g., 30 seconds, 1 minute, or 3 minutes) or after one or more consecutive unsuccessful responses, the analytics service 208 can terminate the session accessed by the client device 201.

Another example of a consistent behavior type user can include a student logging into a remote desktop or surfing the web. In this case, any software used by the user on the remote desktop may not indicate suspicious behavior, as well as web surfing for information on any subject. Furthermore, the user can be located anywhere including other countries to access the remote session. However, the user may navigate through various folders and files within the remote session. The user may be attempting to access one or more files restricted for only an administrator of the remote session. Additionally, the user may attempt to download pre-existing files from the remote session. The analytics service 208 can receive these new data from the remote desktop. The machine learning engine 212 can extract features from the new data to generate the user representations. The machine learning engine 212 can compare user representations to one or more historical representations of the account owner. In this case, the behavior of attempting to download files or access certain files can indicate a distance greater than a threshold associated with the account owner. Therefore, using output from the machine learning engine 212, the analytics service 208 can determine that the user is suspicious and does not behave under a common path. The DPS 202 can take into account combinations of features to determine suspicious activities by users.

An example of inconsistent behavior users can include users that often travel (e.g., to other states, countries, or continents). These users may access an application at any location. For example, a user can access a session in a file-sharing application to upload or download different types and sizes of files. The analytics service 208 can collect behavioral data from the client device 201 for storage in the user data storage 220. The machine learning engine 212 can extract at least the abovementioned features and attributes of the user. The machine learning engine 212 can generate representations of the user using a model trained by the training dataset of the account owner.

The machine learning engine 212 can extract all features identifiable from the input dataset. The machine learning engine 212 can generate a representation of the user using combinations of features. Referring to the previous example, the type of features can include the length of time the user remain in a session (e.g., 9 hours on weekdays and 4 hours on weekend), the length of session time at different locations (e.g., 9 hours at work, 4 hours at home, or 12 hours in other locations), types of files managed at different locations, or other combination of features to generate a representation. The machine learning engine 212 can generate a current representation of the user behavior in real-time or in a predetermined length of time since initiating the session (e.g., 30 minutes, 1 hour, or 2 hours). The DPS 202 can compare the current representation to the historical representation to determine a distance between the two representations. In some cases, the current representation can be compared to multiple historical representations. The distance output from the comparisons can be aggregated. The distance can indicate how far the user behaves from their typical pattern or normal path (e.g., as represented by the historical representation). The distance can include a range, for example, from 0 to 1, 0 to 10, among others. The DPS 202 can compare the distance to a threshold.

If the distance is greater than the threshold, the analytics service 208 can take at least one action to the session. These actions can be instructions retrieved from the instructions storage 240. For example, the action can include transmitting a request for credentials to the client device 201. The request can include multifactor authentication, biometric identification, email authorization, or other techniques to confirm the identity of the user. The action can include terminating the session based on an indication of a high-security threat. For example, if the behavior of the user entails a data breach, extortion of data, or a violation of the application server policy.

In another example, the action can include locking the user account to prevent subsequent access to the session. The user can unlock the account, for example, by resetting the password, contacting the organization to reinstitute the account, or via an email confirmation that session access was by the account owner. Another action can include transmitting a push notification to the client device 201 or one or more other devices associated with or related to the account owner. The push notification can indicate to the account owner to acknowledge that the session is being accessed by an authorized person. The DPS 202 can perform other actions in addition to the actions described above.

If the distance is less than the threshold, the DPS 202 may not perform any action on the session. Instead, the DPS 202 can continue to monitor the behavior of the current user by comparing a new representation to the most recently generated representation. For example, if the current representation does fall from the common path, the analytics service 208 can use the current representation as at least one of the historical representations. Therefore, the machine learning engine 212 can compare the next representation to the historical representation that was the current representation. This process may be looped, to determine whether the current user is suspicious. For example, the previous user can be historically consistent. By comparing recent representations against one another, the machine learning engine 212 can determine the consistency of the current user, thereby detecting any suspicious behavior.

In some cases, the machine learning engine 212 can extract different features based on the dynamic of each user. For example, the machine learning engine 212 may not extract location metric if the client device 201 is a desktop used to access an application. The desktop can be fixed at a work location. However, the machine learning engine 212 can extract location metric if the client device 201 refers to a mobile device used to access the application.

The threshold can be personalized to each user. For example, a threshold for a user with inconsistent behavior (e.g., a first user with a first threshold) can be higher than another user with consistent behavior (e.g., a second user with a second threshold). The first threshold can be 0.6 and the second threshold can be 0.4, for example. Therefore, the DPS 202 can tolerate inconsistent actions identified for the first user than the inconsistent actions from the second user. Inconsistent actions can refer to behaviors that diverge from the common path. The common path can be respective to each user. For example, the machine learning engine 212 can generate multiple representations from the data of each user. The representations can be compared to one another to determine distances for aggregation. The aggregated distance can be the threshold for the respective user. In this case, the distances from comparing the representations of the first user can be higher than distances of the second user, since each representation can be inconsistent for the first user (e.g., numerically inconsistent). For example, distances for the first user can be 0.3, 0.5, and 0.7. The distances for the second user can be 0.2, 0.3, and 0.4. An aggregated first distance of the first user can be 0.3 for minimum, 0.7 for the maximum, or 0.5 for the mean. An aggregated second distance for the second user can be 0.2 for the minimum, 0.4 for the maximum, or 0.3 for the mean. Therefore, the DPS 202 can tolerate inconsistent behavior of the first user more than the second user. By tolerating actions, the DPS 202 can continue to monitor the user behavior rather than taking an action on the session (e.g., terminating the session or transmitting a request for authentication) or notifying the organization of the application.

The threshold can be determined globally for all users or devices. This threshold can be referred to as a global threshold. The global threshold can be determined using a similar process as the personalized threshold. For example, the DPS 202 can determine multiple personalized thresholds for various users. The analytics service 208 can aggregate the threshold to determine the global threshold. In this case, the global threshold can be an average, a medium, a minimum, or a maximum value of the personalized thresholds, among other aggregation methods. In some cases, the pairwise distances across representations from multiple users can be used directly as a global threshold. In this case, the analytics service 208 can determine the global threshold or peer threshold without aggregating personalized thresholds. The global threshold can be determined by an organization, an administrator, or an overseer of an application. The global threshold can be assigned for the application (e.g., associated with the application). The global threshold can be assigned to other applications, software, or devices. In the case of devices, the global threshold can pertain to devices provided by an organization, for example. In some cases, the global threshold can extend to multiple applications.

The threshold can be determined for a group of devices or users. This threshold can be referred to as a peer threshold. The peer threshold can be predetermined by an organization managing an application. The peer threshold can be determined by aggregating personalized thresholds of a group of users. For example, the peer threshold can be determined based on personalized thresholds of users within the organization (e.g., employees or users accessing the application within the location of the organization). The analytics service 208 can compare the distance of each user to the peer threshold when using the application of the organization. In this case, the peer threshold can be linked directly to the application. In further example, the peer threshold can be location-based. By using the application within the organization building, the distance of the users can be compared with the peer threshold. The users may be employees, for example. Hence, the behaviors of each employee can be compared among other peers.

The analytics service 208 can compare the distance of each user to multiple thresholds or all available thresholds. For example, the analytics service 208 can compare the distance (e.g., aggregated distance) of a current user to two or more thresholds, such as the personalized threshold, the global threshold, or the peer threshold. The comparison can be performed with any combinations of thresholds. The analytics service 208 can execute different instructions retrieve from the instructions storage 240 based on the distance equal to, greater than, or less than a number of thresholds. For example, a user can access a publicly available application using the client device 201. The distance of the user can be compared to a personalized threshold and global threshold. The analytics service 208 can allow the user to continue accessing the session if the distance of the user is less than the personalized threshold. However, the global threshold can be lower than the personalized threshold. The analytics service 208 can determine that the distance exceeds the global threshold. Therefore, the user may be restricted from accessing certain files, folders, or other elements within the application, for example. In some cases, to access restricted items, the analytics service 208 can transmit a request to the client device 201 to confirm the user identity.

In some cases, the global threshold can be higher than the personalized threshold. For example, the global threshold can indicate common behaviors of all users. Therefore, users who satisfy their personalized threshold can satisfy the global threshold. The machine learning engine 212 can aggregate the distances from users to determine the global threshold. The global threshold can be a maximum of all aggregated distances, for example. The global threshold can be either the median, the minimum, or the mean of the distances. The machine learning engine 212 can add numerical value to the global threshold, such as to increase or decrease the expectation for suspicious behaviors.

The analytics service 208 can compare the distance of a user to the personalized threshold, the global threshold, and the peer threshold. For example, an application managed by an organization (e.g., remote application for work) can be accessed by a user of the client device 201. The behavior of the employees within the organization using the application can be similar. Therefore, the peer threshold can be used for comparing the distance of the user to other employees within the organization. In some cases, the analytics service 208 can suspend the session accessed by the client device 201 if the distance of the current user does not satisfy all thresholds. In some other cases, the analytics service 208 can allow the session access if the distance satisfies the peer threshold. For example, by satisfying the peer threshold, the analytics service 208 can determine that the user behave similarly to employees within the organization. Therefore, the analytics service 208 may not notify the organization or the administrator.

If the distance of the user is equal to at least one of the thresholds, the analytics service 208 can execute instructions or actions similar to either when the distance is greater than or less than the threshold, for example. An organization can determine actions the analytics service can take responsive to the comparison between the distance and any thresholds. The analytics service 208 can perform any of the aforementioned actions based on the distance satisfying all thresholds (e.g., allow access to the session), does not satisfy any threshold (e.g., terminate the session, restrict access, and notify an administrator), or satisfy at least one threshold (e.g., allow access, restrict some features, request additional credentials, or similar actions to not satisfying any threshold).

The analytics service 208 can generate additional historical data of the user upon receipt of the user data. The historical data can be stored in historical data storage 236. The analytics service 208 can generate additional historical data if the user is the account owner or the device owner (e.g., authorized personnel or rightful accessor), for example, if the distance of the user satisfies a personalized threshold. The analytics service 208 can update an existing historical representation of the user based on the historical data or the features extracted from the historical data. The current representation of the user can be a historical representation for the next iteration to determine a second distance of the user.

The machine learning engine 212 can generate a peer threshold by selecting data samples from employees within an organization. For example, the analytics service 208 can select two data samples belonging to employees in addition to a user data sample. The machine learning engine 212 can generate three representations using the user data sample and the two data samples from the employees. The machine learning engine 212 can determine distances between the combinations of the representations. The machine learning engine 212 can aggregate the distances to determine a peer distance threshold. The peer threshold can be used for applications managed by the organization.

The DPS 202 can detect insider threats. For example, a current user and a historical user, such as an account owner, can be the same user. The historical representation of the user can indicate a common path or normal behavior using the application. However, based on the current representation of the user the machine learning engine 212 can determine that a current distance of the user is greater than or equal to at least one of the thresholds for the application. The analytics service 208 can therefore determine that the user is acting suspiciously and may be an insider threat. The analytics service 208 can notify the organization of this suspicion. The analytics service 208 can suspend the user account, such as temporarily or until further action by an administrator.

The DPS 202 can include the data repository 216. The data repository 216 can be referred to as a storage component, local storage to the intermediary device, server storage, a memory, or a resource inventory. The data repository 216 can include at least user data storage 220, model storage 224, representation storage 228, threshold storage 232, historical data storage 236, and instructions storage 240. The storage can store collected, generated, trained, or configured data in any data management scheme. For example, the data can be stored as in a table. The table can include rows and columns for the data, the user associated with the data, among others. The data can be stored as a cluster, an information pool, or an appendix.

The user data storage 220 can store collected information from a current user. For example, the information can include IP address, network connection data, location data, hardware data, among others. The user data storage 220 can store data samples used by the analytics service 208 or the machine learning engine 212. The user can authorize the DPS 202 to collect the information. In some cases, the DPS 202 can request access to the information to authenticate user identity during session usage. The DPS 202 may limit certain functionalities within the application if the user restricts access to the device information. The user data can be transferred from the user data storage 220 to the historical data storage 236 if the user is not suspicious. For example, the analytics service 208 can compare a distance of the user during the session to at least one threshold. The analytics service 208 can determine that the distance satisfies the threshold (e.g., less than the threshold), indicating the same user. Therefore, the user data can be historical data to generate one or more historical representations.

The model storage 224 can store one or more models for the machine learning engine 212. The machine learning engine 212 can generate the models using a training dataset from a known user, such as an account owner, a device owner, or an employee within an organization. Each model can be trained for a respective user. Each model can be trained for all users using an application or any applications implemented with the DPS 202. The model storage 224 can include a pre-existing model. The machine learning engine 212 can train the model using the training dataset.

The machine learning engine 212 or other components within DPS 202 can retrieve the trained model to generate one or more representations of a current user. For example, the analytics service 208 can input extracted features from data samples of the current user into the trained model retrieved from the model storage 224. The machine learning engine 212 can generate a representation corresponding to each extracted feature. The representation can indicate the behavior of the current user related to the feature, such as a sequence of locations the current user follows.

The representation storage 228 can store representations generated or determined by the machine learning engine 212. In view of the above, for example, the representations can be an output of the machine learning engine 212 using the trained model. The representations stored in the representation storage 228 can be associated with a respective user (e.g., labeled with a user ID). Each representation can correspond to a feature extracted from user data or historical data. One or more components of the DPS 202 can retrieve the representations from the representation storage 228. The comparison of representations can be expressed as at least one numeric value (e.g., distance). A comparison between two representations can yield a single distance. Comparisons between three representations can yield three distances. The distances can be aggregated into a single distance, for example. The distance may be stored generally in the data repository 216, as part of the user data, the historical data, or as a threshold.

The threshold storage 232 can store one or more thresholds determined based on one or more distances. The distance can be determined based on a comparison between two representations or comparisons between three or more representations. For example, the machine learning engine 212 can generate three representations from three different data samples or sessions of a user. This can be a personalized threshold for the user. The three representations can be compared to determine three distances, for example, comparing first to second, second to third, and first to third. Since there is more than one distance, the three distances, in this case, can be aggregated. The maximum, the minimum, the mean, the median, or other clustered values can be used as the threshold. The aggregation can be determined by the organization of an application, for example. The machine learning engine 212 can select an aggregation process to determine the threshold. The threshold can gauge the consistency or inconsistency of user behaviors. Thus, if the user is generally more inconsistent, the threshold to determine suspicious behavior can be higher (e.g., or lower depending on if the distance increases or decreases upon more suspicious behaviors).

The threshold storage 232 can store a peer threshold and a global threshold. The peer threshold can be an aggregation of personalized thresholds of users within an organization, among others, such as determined directly from pairwise distances. These users can be employees, staff, or employers, for example. The global threshold can be an aggregation of personalized thresholds from users using the application. These users can be anyone with access to the application, such as account owner, subscribers, or customers. The aggregation process can be similar to the discussion above. In some cases, the peer threshold can be set by the organization. In some other cases, the global threshold can be set by an administrator of the application. The machine learning engine 212 can use other processes to determine the thresholds and the analytics service 208 can store the thresholds in the threshold storage 232.

The historical data storage 236 can store historical data of users. The historical data can be referred to as past information, previous data, recent data (e.g., different from the current data), or other data from the users. The historical data may not be from the same user. Similar to the other storages, the historical data can be labeled and associated with respective users. The historical data can be data from the user data storage 220. For example, if the distance determined using the user data satisfies a threshold, the analytics service 208 can transfer (e.g., move or copy) the user data to the historical data storage 236. However, if the distance does not satisfy the threshold, the user data may not be stored in the historical data storage 236. Instead, this user data may be discarded, since the user is unidentified in the system.

The historical data can be retrieved from the historical data storage 236. The historical data can be used to generate historical representations. The machine learning engine 212 can compare at least one current representation of a current user to historical representations to determine an aggregated distance for the current user. The DPS 202 can increase the accuracy of the distance for the current user by comparing the current representation to more historical representations of the user. In some cases, the current representation can be stored and used as a historical representation. For example, using the current representation as the historical representation, the current representation can be compared to the next representation of the user.

The instructions storage 240 can store instructions, actions, or commands for components of the DPS 202. The instructions can be used for interactions between the components of the DPS 202. For example, the roles and responsibilities each component is assigned. The instructions storage 240 can include a label for each instruction. The instruction can be performed by any component of the DPS 202. The label can indicate situations to execute the instruction, such as when detecting suspicious activities or users. For example, the analytics service 208 can determine to terminate the session if the distance of the current user is greater than a threshold (e.g., at least one of the thresholds). In the same situation, the analytics service 208 can request for multifactor authentication, lock an account to restrict subsequent access, or transmit push notification to an administrator or the organization notifying suspicious user. If the distance is less than the threshold, based on the instructions stored in the instructions storage 240, the analytics service 208 can continue monitoring the behavior of the current user. Other instructions can be stored here in addition to the aforementioned.

The cloud 244 can be referred to as a cloud service, a cloud storage service, or a remote service 248. In some cases, the cloud 244 can be a server, a cloud application, or a part of the application server, where the DPS 202 can be an intermediary device between the cloud 244 and the client device 201. For example, the DPS 202 can receive a request from the client device 201 to access the application on the cloud 244. The cloud 244 can generate a session with a session ID. The cloud 244 can transmit the session ID to the client device 201. The DPS 202 can monitor the activities of the user in the session. For example, the DPS 202 can transmit a notification to an administrator of the cloud 244 if the user is suspicious.

The cloud 244 can include at least a remote service 248 and a cloud storage 252. The cloud 244 can include one or more processors and at least one memory. The remote service 248 can perform the features described to interact with the DPS 202 and the client device 201. The cloud 244 can be in communication with other components of the system 200 via the network 203. In some cases, the remote service 248 can perform the features and functionalities of the DPS 202. For example, the remote service 248 can include features and functionalities similar to at least the interface 204, the analytics service 208, and the machine learning engine 212. The remote service 248 can perform machine learning techniques or deep learning techniques to detect suspicious users. The cloud storage 252 can store information similar to the data repository 216. In this case, the DPS 202 can relay information from the client device 201 to the cloud 244. The cloud 244 can store receipt information in the cloud storage 252.

The cloud storage 252 can include an authorization passcode for the users (e.g., account owners) of an application executing on the cloud 244. For example, the cloud 244 can receive credentials from the client device 201 via the DPS 202. The cloud 244 can compare the credentials to a list of existing account logins. If the credential matches with the existing account login, the cloud 244 can create a session and transmit the session ID to the client device 201. If the credential does not match any recorded account login, the cloud 244 can request additional credentials from the user. The cloud 244 can lock an account (e.g., associated with an email or username) the user attempt to login to.

The cloud 244 can manage a file-sharing application where devices can access via one or more sessions. For example, the DPS 202 can receive indications (e.g., dataset) of any files or folders accessed, uploaded, or downloaded from the cloud storage 252. The dataset can be used as a training dataset for a user. For subsequent users, such as those logged into the account of the previous user, the DPS 202 can monitor the file management behavior to determine any suspicious activities. The activities can be a combination of features. For example, file size downloaded at a location, a number of files upload using a type of network connection, and other combinations of at least the features previously discussed. Hence, the cloud 244 can be a server managing the application and the DPS 202 can monitor and notify the server of suspicious behavior. The cloud 244 can be other remote services or application services.

Figure 3:
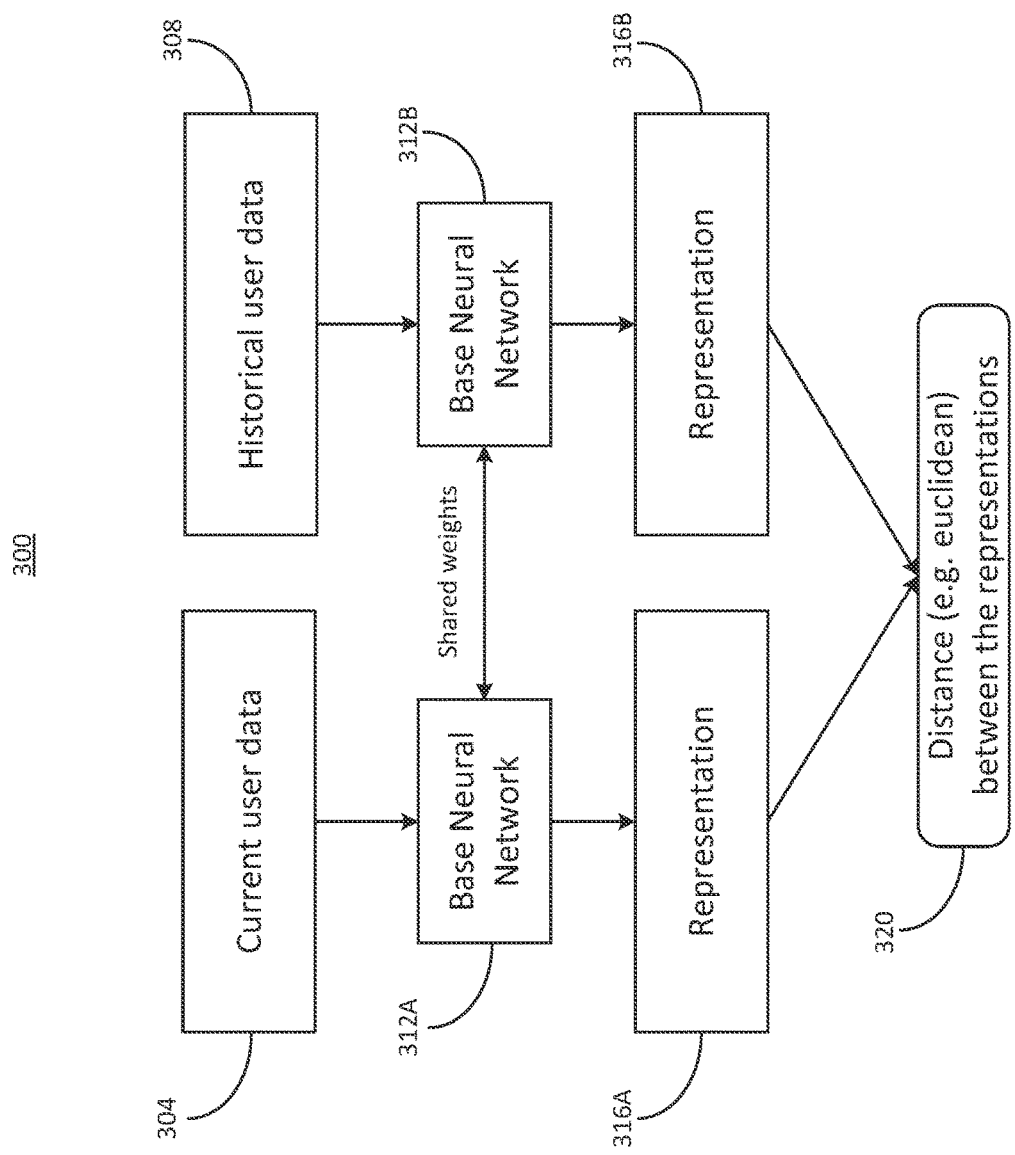
FIG. 3 is a flow diagram of an example method for managing session access, in accordance with an implementation.

Referring to FIG. 3, a flow diagram 300 of an example method for managing session access is shown, in accordance with an implementation. The acts in the flow diagram 300 can be performed by one or more systems or components depicted in FIG. 1 or FIG. 2, including, for example, the DPS 202, analytics service 208, or the machine learning engine 212. The DPS 202 can perform the flow process as described in the flow diagram 300 or other flow diagrams. For example, the DPS 202 can aggregate the behaviors of a user within a timeframe, such as an hour. The DPS 202 aggregate behaviors of other users accessing a session. The aggregated behaviors can be represented by a set of features. The DPS 202 may be referred to as the system herein. The flow diagram 300 can include different layers to determine a distance between representations. For example, current user data 304 can include a set of features of a current user. Historical user data 308 can include a set of features by another user, such as an account owner. The current user data and the historical user data can be in an input layer. The input layer can include multimodal or multivariate data. The system can feed the current user data 304 and the historical user data 308 to base neural networks 312A and 312B, respectively. The base neural networks 312A and 312B can be similar to other base neural networks operated by the machine learning engine 212 of the system. The base neural networks 312A and 312B can be embedding networks. For example, the analytics service 208 of the system can feed the current user data 304 and the historical user data 308 to the base neural networks 312A and 312B.

The base neural network 312A can output representation 316A (e.g., embedding) of the feature set for the current user data 304. The base neural network 312B can output representation 316B for the feature set of historical user data 308. The representations 316A-B can be in the output layer of the flow diagram 300. The representations 316A-B that refer to data coming from the same user across different time can be learned to be similar (e.g., generating a small distance). The representations 316A-B that refer to data coming from different users can have larger differences (e.g., large distance). The system can compare the representations 316A and 316B to determine a distance 320 (e.g., distance metric or Euclidean) between the representations. In some cases, the current user data can be compared to multiple historical data of the user. For example, the lower the distance 320, the more similar the current behavior (e.g., current user data 304) is to the historical behavior of the user (e.g., historical user data 308). Therefore, the higher the distance 320, the less similar between the two behaviors. In some cases, the system can be configured such that a lower distance represents more differences and a higher distance represents more similarities between the behaviors. The user associated with the historical behavior may not be the same user as the current user.

The system can compare each new data sample against the distribution of all historical samples from other users. The system can identify any features or combination of features outside the boundaries (e.g., as compared to the historical samples) as an anomaly. The system can define a similarity metric directly between two data samples. The system can allow for multimodal features for inputs to identify suspicious users. The system can improve the security of the organization and improve the accuracy in identifying threats, such as reducing false positives and false negatives in the detection system.

Figure 4A:
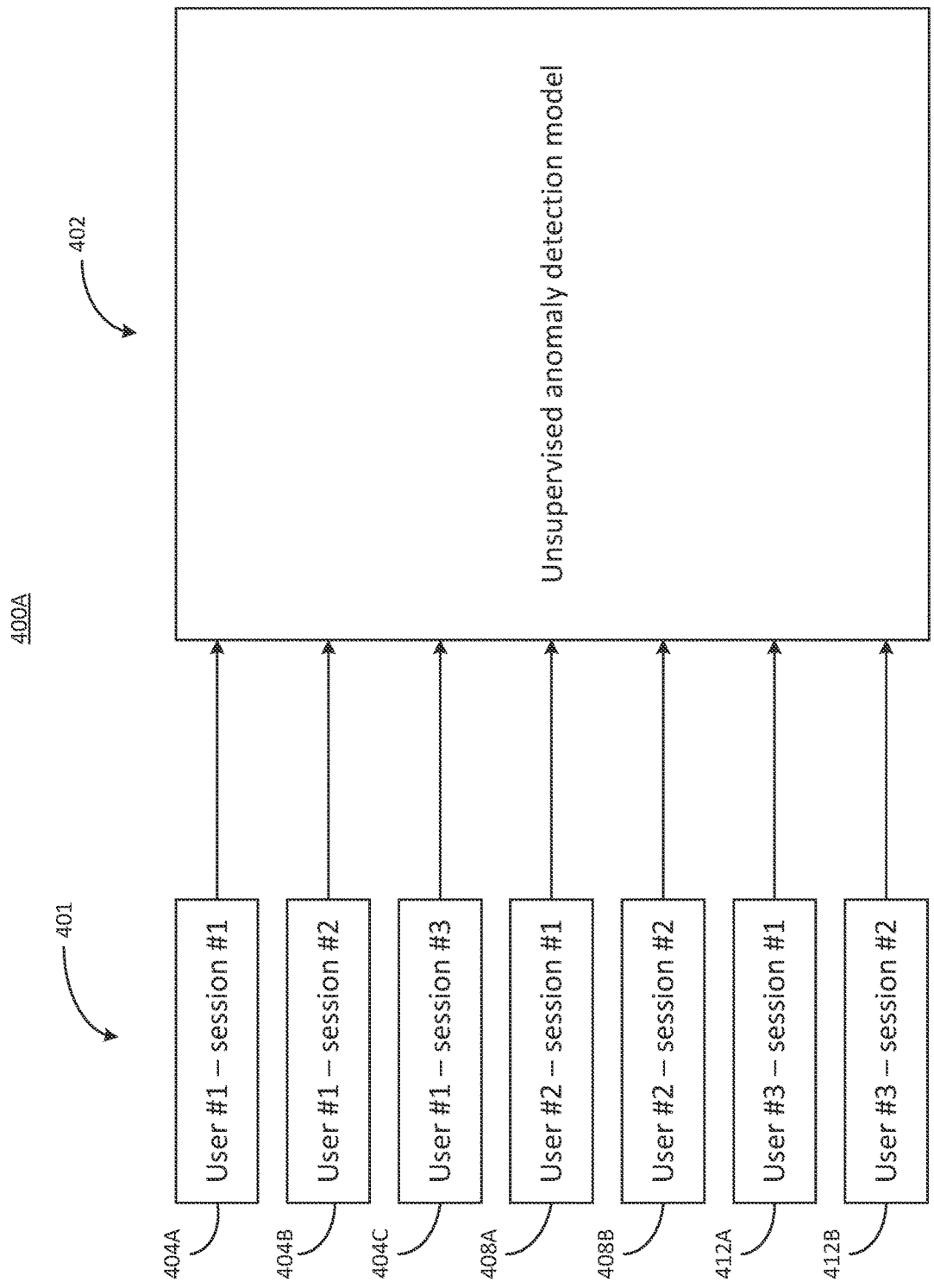
FIG. 4A is a flow diagram of an example unsupervised anomaly detection model.

Referring to FIG. 4A, a flow diagram 400A of an example unsupervised anomaly detection model. The flow diagram 400A can illustrate example features of the unsupervised anomaly detection. The system, including one or more components of the DPS 202, can use distance metric learning techniques to analyze the behaviors of users, which is an improvement over the features of the unsupervised anomaly detection. For example, the flow diagram 400A can include three users with multiple corresponding sessions. Sessions 404A-C can be from the first user. Sessions 408A-B can be from the second user. Sessions 412A-B can be from the third user. Datasets from the users can be generated from the sessions. The dataset can be used as input features 401. The input features 401 can be input into a model 402. In this case, model 402 is the unsupervised anomaly detection model to illustrate example features of the unsupervised model.

The unsupervised model attempts to detect cases that could indicate potential threats, risks, or other scenarios deemed valuable by solution use case (e.g. compromised accounts, data exfiltration, insider threats). For example, using the unsupervised model, the current behavior can be identified as unusual based on comparisons to historical sessions of all users (e.g., users using the application). Therefore, the unsupervised model of this example calculates a number showing how unusual a session is compared to historical sessions of all users. However, the unsupervised model may not account for other risks, such as insider threats, since the suspicious user is the same as the account owner, for example. Thus, by using the one or more components of the DPS 202, among others in connection to FIG. 2, anomalies in user behaviors can be detected to improve the security of the organization managing application for user access.

Figure 4B:
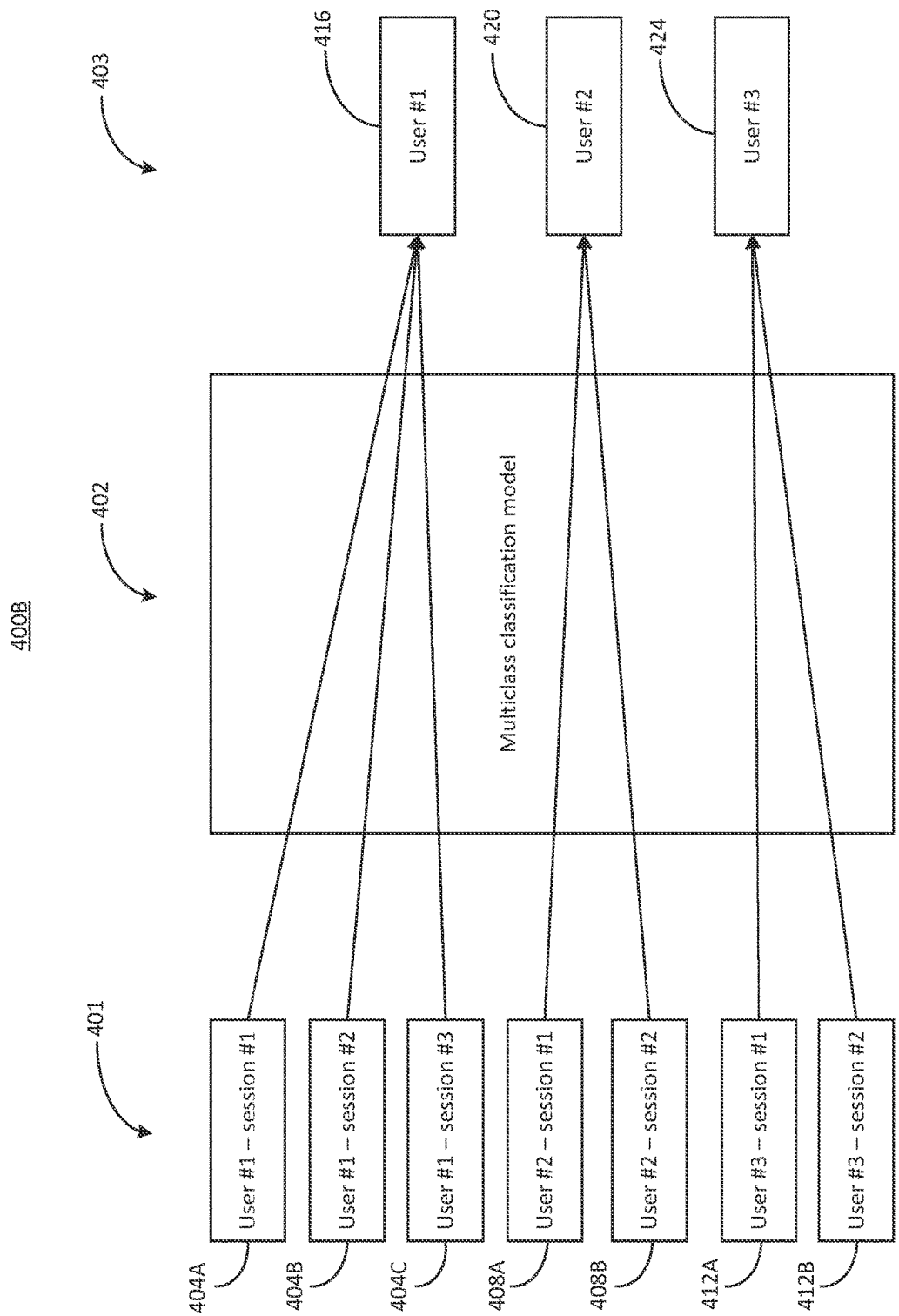
FIG. 4B is a flow diagram of an example method for multiclass classification.

Referring to FIG. 4B, a flow diagram 400B of an example method for multiclass classification is shown. At least one of the features described in flow diagram 400B can be performed or operated by one or more components of the DPS 202. The method can illustrate an overview of the multiclass classification model. The method can use a supervised multiclass classification model to predict the identity of the user is based on one or more features (e.g., in some cases multimodal). The method can include input features 401, a model 402 (in this case the multiclass classification model), and target variables 403. The input features 401 can include datasets from sessions 404A-C, 408A-B, and 412A-B, for example. For training the multiclass classification model, the method can create a labeled dataset. The data set can include features that belong to known or predetermined users. During inference, the method can calculate the same features for the last user within a predetermined timeframe, such as an hour. The method can propagate the features through the model 402 to determine a probability that these features belong to each of the users, such as the first user 416, the second user 420, or the third user 424 as shown. In the case of multiclass classification, if the probability of the data sample belonging to the actual user is low, the method can determine that the data sample does not belong to the actual user.

Referring to FIG. 4C, a flow diagram 400C of an example method for binary classification is shown, in accordance with an implementation. The acts in the flow diagram 400C can be performed by one or more systems or components depicted in FIG. 1 or FIG. 2, including, for example, the DPS 202, analytics service 208, or the machine learning engine 212. The DPS 202 can be referred to as a system. In view of the example above, an assumption can be made that while the features are not able to uniquely distinguish each user from the rest, the features can include information to determine if two data samples refer to the same user or not. In other words, a first data sample can compare with a second data sample to determine whether the users are the same or not, for example.

The method can include input features 401, a model 402, and target variable 403. In this case, the method can include groups of data sample pairs, such as groups 428, 432, and 436. For example, group 428 can include data samples from sessions 404A and 404B. Group 432 can include data samples from sessions 408A and 412B. Group 436 can include data samples from sessions 404A and 412B. Each group can represent a new data sample containing the features of two users/sessions. The model 402 used can be a binary classification model. The method can include receiving two or more inputs (e.g., data samples). The method can include determining whether the data samples refer to the same user or not, as indicated in the target variable 403. The features may not uniquely distinguish each user. The method can include two classes independent of the number of users, thereby reducing resource consumption when training a model. The method can use an existing model for new users (e.g., not re-trained model), as the method can use a single historical sample of the user in the existing model to determine whether data samples from different sessions belong to the same user or not. The method can include using one data sample (e.g., features) of each user to determine whether or not the samples belong to the same user (e.g., One-Shot Learning). In some cases, the method can include identifying whether the current behavior is similar to historical behavior of the user. The target variable 403 in this example can include an output of same user 440 or different user 444.

The binary classification model prediction may utilize error-based loss functions like cross-entropy loss. However, for example, the binary classification model is used to classify input samples, instead of differentiating between them. Therefore, the binary classification model in this case may not be fit to utilize a classification loss function. Hence, the one or more components of the DPS 202 can perform features and functionalities to differentiate the input samples, such as by using a distance-based loss function. The distance-based loss function can embed semantically similar data samples close together. Unlike other loss functions, such as cross-entropy loss used to learn to predict directly a label, the distance-based loss functions, for example, can determine relative distances between inputs.

Figure 4D:
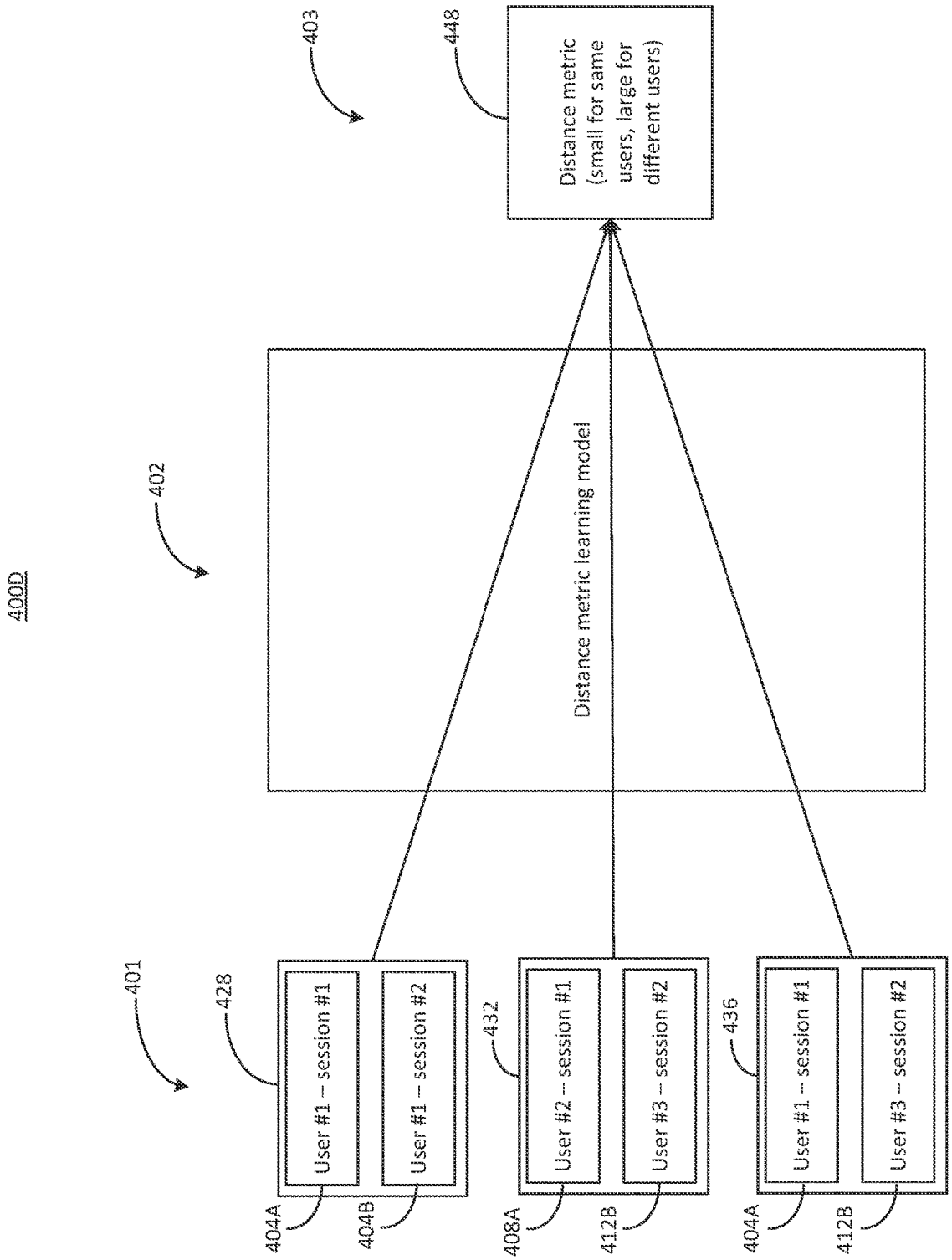
FIG. 4D is a flow diagram of an example method for distance metric learning, in accordance with an implementation.

This task to determine relative distance can be referred to as distance metric learning, as in connection to FIG. 4D.

Referring to FIG. 4D, a flow diagram 400D of an example method for distance metric learning is shown, in accordance with an implementation. The acts in the flow diagram 400D can be performed by one or more systems or components depicted in FIG. 1 or FIG. 2, including, for example, the DPS 202, analytics service 208, or the machine learning engine 212. The DPS 202 can be referred to generally as a system. The system can determine how far a current behavior is from a historical behavior, which may or may not belong to the same user. The system can use distance-based loss functions, such as contrastive loss or triplet loss. The methods herein can use the triplet loss function as an example. However, the system can utilize other distance-based loss functions.

The system can perform machine learning or deep learning techniques. For data preparation, the method can include model training and model inference, for example. For example, the flow diagram 400D can include input features 401 of groups 428, 432, and 436, with data from sessions 404A and 404B in the first group 428, data from sessions 408A and 412B in the second group 432, and data from sessions 404A and 412B in the third group 436. The groups can represent a new data sample containing features of two users/sessions, in this case. The input features 401 can be pass to model 402, e.g., distance metric learning model, in this case. The model can output a target variable 403. In this case, the target variable 403 can be the distance metric 448. For example, a small distance metric can indicate that the users of different sessions are the same user (e.g., group 428). A larger distance metric can indicate that the users of different sessions are different users (e.g., groups 432 and 436).

For example, the system can pre-process the raw data of input features 401. The system can extract the features from raw data. The system can group the features into a cluster of different types of features. The system can use provide the input to downstream models. The system can be used to detect suspicious behaviors for each user during a predetermined time in a session, such as an hour. The system can be configured to extract a certain set of features to provide to model 402. In some cases, the system can determine which features to use for the set of features, for example, by comparing differences between each type of feature. In a further example, the download volume in the past hour can be used as a feature to determine potential data exfiltration. Furthermore, the system can extract location patterns of the user (e.g., sequence of client device 201 locations) accessing the session to indicate an account takeover or a compromised account. The system can extract features from existing univariate risk indicators of one or more analysis systems. The system can generate other features among those previously described. The features may be tailored to specific systems. The system can generate multimodal features for describing example methods hereinafter.

Figure 5A:
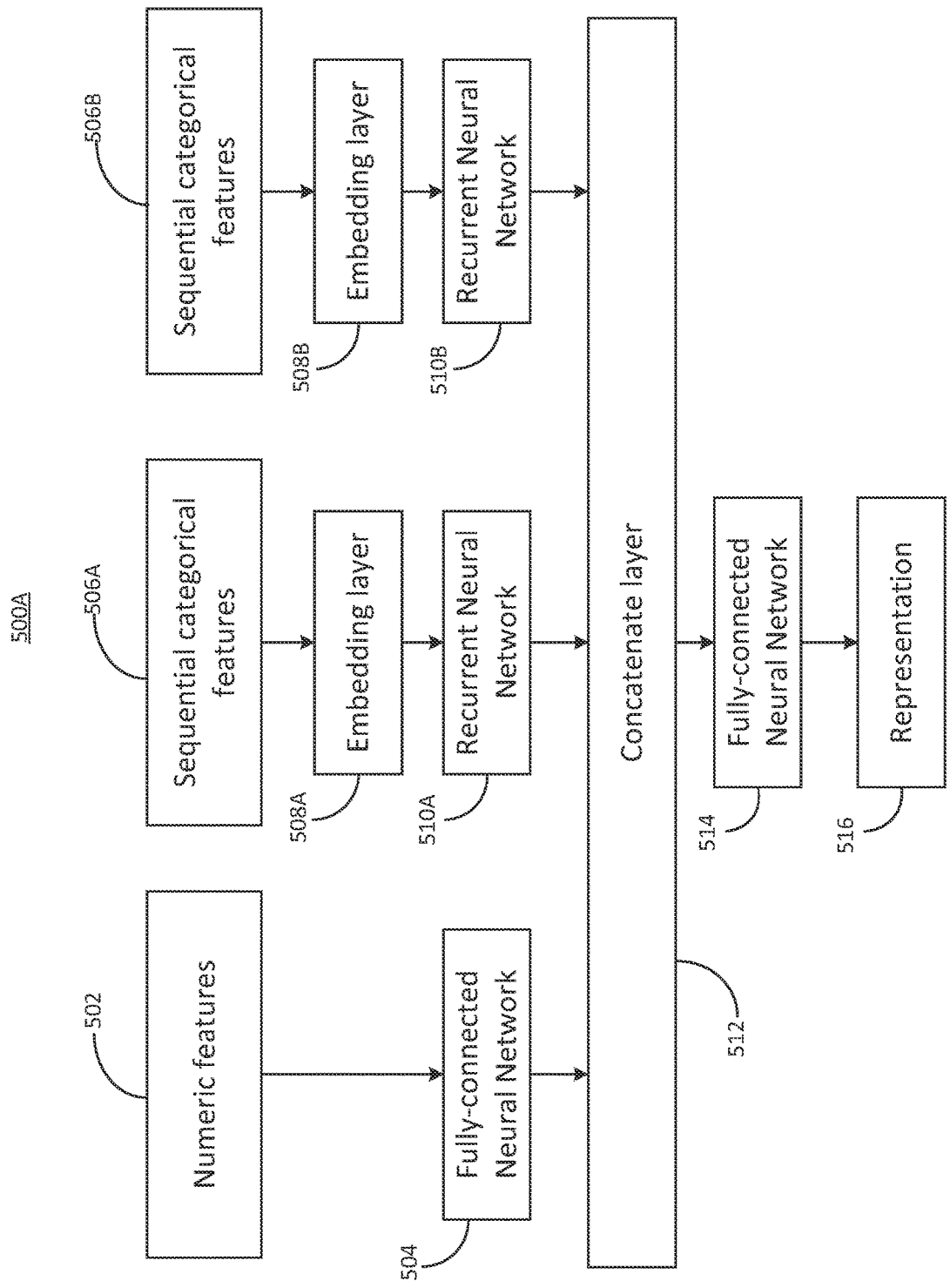
FIG. 5A is a flow diagram of an example Base Neural Network architecture, in accordance with an implementation.
Figure 5B:
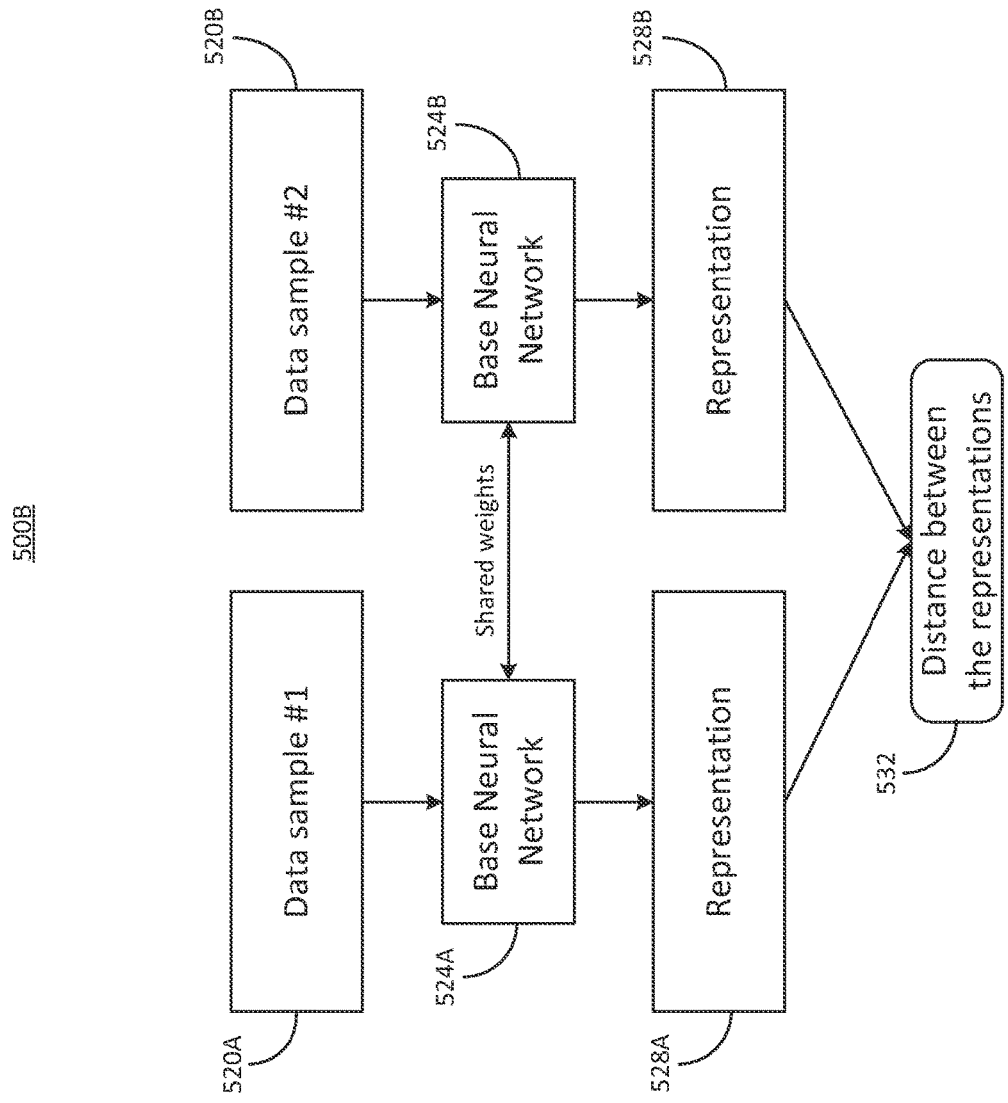
FIG. 5B is an example method for determining a distance between representations using a Siamese Neural Network structure, in accordance with an implementation.
Figure 5C:
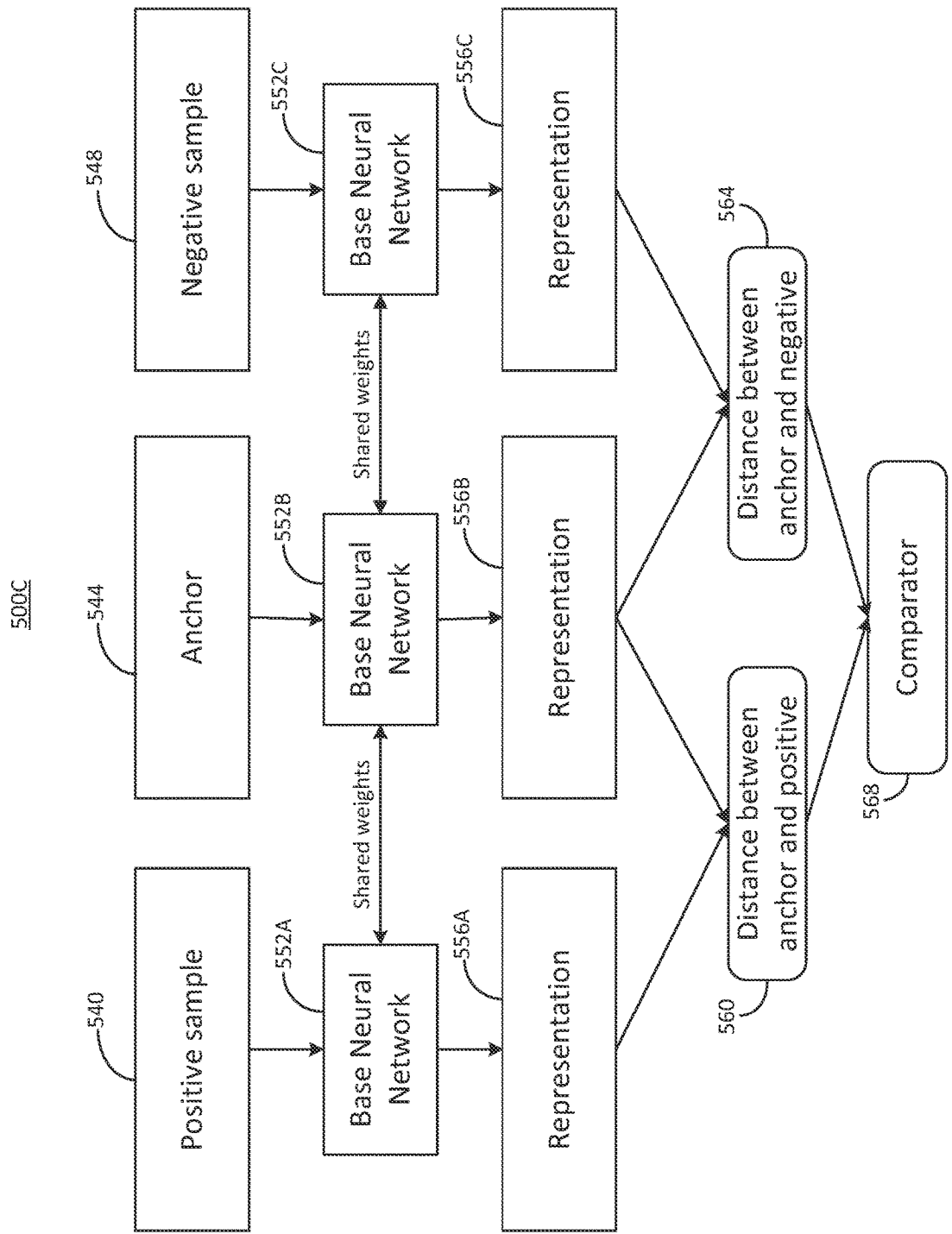
FIG. 5C is an example method for determining a distance between representations using a Triplet Neural Network structure, in accordance with an implementation.

Referring to FIGS. 5A-C, flow diagrams of examples Neural Network architecture are shown, in accordance with an implementation. The processes of flow diagrams can be performed or operated by one or more components of the DPS 202 (e.g., the system). The system can calculate or extract features, such as described in at least FIGS. 2, 3, 4C, and 4D, using historical data. The historical data can be gathered by an underlying system, such as an application system, application server, or cloud service. In some cases, the system can gather the historical data. The system can store or save the historical data in a data repository.

Once the features and data samples are generated from the historical data, the system can train a model. In some cases, the system can generate a model from scratch. The features can be numeric features 502 (e.g., download size, a number of files downloaded, or upload size) or sequential categorical features 506A-B (e.g., locations, site navigation, or software executed during a session). The system can generate other types of features. The system can utilize a distance machine learning technique.

Referring to FIG. 5A in greater detail, a flow diagram 500A of an example base Neural Network architecture is shown, in accordance to an implementation. The acts in the flow diagram 500A can be performed by one or more systems or components depicted in FIG. 1 or FIG. 2, including, for example, the DPS 202 (e.g., system), analytics service 208, or the machine learning engine 212. The system can include at least one base neural network ("BNN") to generate final embeddings. The BNN can handle multivariate, multimodal features, and other options regarding the architecture of the BNN. For example, the flow diagram 500 can illustrate a neural network with multiple inputs, such as the numeric features 502 and sequential categorical features 506A-B. Numeric features 502 can be fed to a Fully-Connected Neural Network ("FCNN") 504. The sequential categorical features 506A-B can be fed to corresponding neural networks. For example, the sequential categorical features 506A can pass through an embedding layer 508A (e.g., map each input datum, such as a location to a fixed-length vector). The fixed-length vectors, such as from the whole sequence of locations, can be pass through a neural network 510A, such as a Recurrent Neural Network ("RNN"). The neural network 510A can handle time-based sequences. The neural network 510A can include other features, such as features of Long-Short Term Memory ("LSTM") networks or Gated Recurrent Unit ("GRU") networks, for example. The embedding layer 508A and the neural network 510A can be fed with the sequence of the categorical features 506A. The sequential categorical features 506A can be compressed in an internal representation, which can be the final output by the neural network 510A. The sequential categorical features 506B can be passed through embedding layer 508B and neural network 510B. The sequential categorical features 506B can include a different type of feature from the sequential categorical features 506A. For example, features 506B can include a sequence of network connections used to access a session. The embedding layer 508B can include similar functionalities as embedding layer 508A. The neural network 510B can include similar functionalities as neural network 510A.

The system can concatenate the output of the FCNN 504 and the neural networks 510A-B in the concatenate layer 512. The system can generate or determine concatenated features. The concatenated features from layer 512 can be passed through another FCNN 514. Once passed, the system can combine the output of the FCNN 514 with the intermediate representations (e.g., produced by the FCNN 504 and the neural networks 510A-B) to create a representation 516 of the features. The representation 516 can represent a summary of all the input features, both numeric features 502 and sequential categorical features 506A-B. The flow diagram 500A can represent a single neural network model. The layers of the flow diagram 500A, including the FCNN 504, embedding layers 508A-B, neural networks 510A-B, and the second FCNN 514 can be jointly optimized for minimizing the overall loss of the model, for example. The flow diagram 500A can show an example of how the system performs with multivariate or multimodal data. The system can exploit correlations among all input features in both modalities since the FCNN 514 can combine the representations output by the FCNN 504 (e.g., a first FCNN) and neural networks 510A-B (e.g., RNNs).

The system can use other architectures to perform the methods described herein The other architecture can achieve similar results or improvements. The base model can be data-specific. The base model can be customized for each use case depending on the features and the data received from each user. For example, the RNN (e.g., neural network 510A or 510B) can be substituted with Convolutional Neural Networks ("CNNs"). The system can optimize the size of the output representation based on the specific features and data used as inputs. The method of flow diagram 500A can be performed for multiple users.

Referring to FIG. 5B, an example method 500B for determining the distance between representations using a Siamese Neural Network structure, in accordance with an implementation, is depicted. The acts in the method 500B can be performed by one or more systems or components depicted in FIG. 1 or FIG. 2, including, for example, the DPS 202 (e.g., system), analytics service 208, or the machine learning engine 212. The system can use at least one distance-based loss functions to identify suspicious users. The loss functions can include contrastive loss and triplet loss, among others. The contrastive loss can be used for Siamese Neural Networks ("SNNs") and the triplet loss can be used for Triplet Neural Networks ("TNNs"). An example of the TNN structure can be referred to at least at FIG. 5C, for example. The SNN structure can be used by the system. The SNN structure can compare pairs of inputs to determine a distance between representations.

The method 500B can include the data processing system receiving a pair of data samples 520A and 520B as inputs. The data samples 520A-B can be passed to the respective base neural networks 524A-B, respectively. The base neural networks 524A-B can include similar weights, parameters, or features used to determine a respective representation. With the SNN structure, the base neural networks 524A-B can output the respective representations 528A-B respectively. Then, the two representations 528A-B can be compared to calculate a distance 532 between the representations 528A-B. The distance 532 can represent, for example, how far the first data sample 520A is from the second data sample 520B. In this case, the first data sample 520A can be summarized as representation 528A and the second data sample 520B can be summarized as representation 528B. The SNN structure can be used by one or more components of the system to train a model. The model can then be used to determine one or more representations of users based on the collected user data and the stored historical data. Furthermore, the trained model can be used to determine a threshold of a user (e.g., personal threshold, global threshold, or peer threshold). The TNN structure can be used for similar objectives. The system can use other Neural Networks to generate representations and determine distances between representations.

Referring to FIG. 5C, an example method 500C for determining the distance between representations using a Triplet Neural Network ("TNN") structure, in accordance with an implementation, is depicted. The acts in the method 500C can be performed by one or more systems or components depicted in FIG. 1 or FIG. 2, including, for example, the DPS 202 (e.g., system), analytics service 208, or the machine learning engine 212. In view of the above example, the base network can be used in the TNN structure. The TNN structure can include triplet loss as the loss function, for example. The triplet loss can be used to determine a relative distance constraint, thereby, allowing the system to identify rankings between the samples.

For example, the method 500C can include the data processing system receiving three sample inputs, such as positive sample 540, anchor sample 544, and negative sample 548. The sample inputs can be passed through base neural networks 552A-C, respectively. The base neural networks 552A-C can share similar weights. Based on the respective inputs, the base neural networks 552A-C can output representations 556A-C, respective of the input samples. The representations 556A-C can be compared among each other. For example, the system can compare representation 556A to representation 556B to determine distance 560. The distance 560 can indicate how far the positive representation 556A is from the anchor representation 556B. The system can compare representation 556C to representation 556B to determine distance 564. The distance 564 can indicate how far the negative representation 556C is from the anchor representation 556B. The distance 560 can be compared with the distance 564 via the comparator 568. The comparator 568 can aggregate the distances 560 and 564, such as to determine a threshold for the user based on the similarity between the positive sample 540 and the anchor sample 544 and the difference between the negative sample 548 and the anchor sample 544.

The data processing system can utilize the TNN structure to train a model (e.g., SNN can also be used). The system can use the trained model to generate a personalized threshold. The system can use the trained model to generate other thresholds, such as a global threshold or peer threshold. The system can use the personalized threshold during inference to identify which users have suspicious behaviors. For example, some users can exhibit consistent behavior across time (e.g. an employee working in the office every weekday for a certain number of hours) while other users can be less consistent in behavior (e.g. a user who often travels and use their devices for different purposes). The system can compare user interactions (e.g., behaviors defined by features extracted from user data samples) to historical data to determine the consistency of the user behaviors over time (e.g., by comparing each hour of the user behavior to the next hour). Therefore, in this example, the system can predict a distance between new user interactions and the user past interactions. The threshold can define a tolerance level between consistent or inconsistent users.

Figure 6:
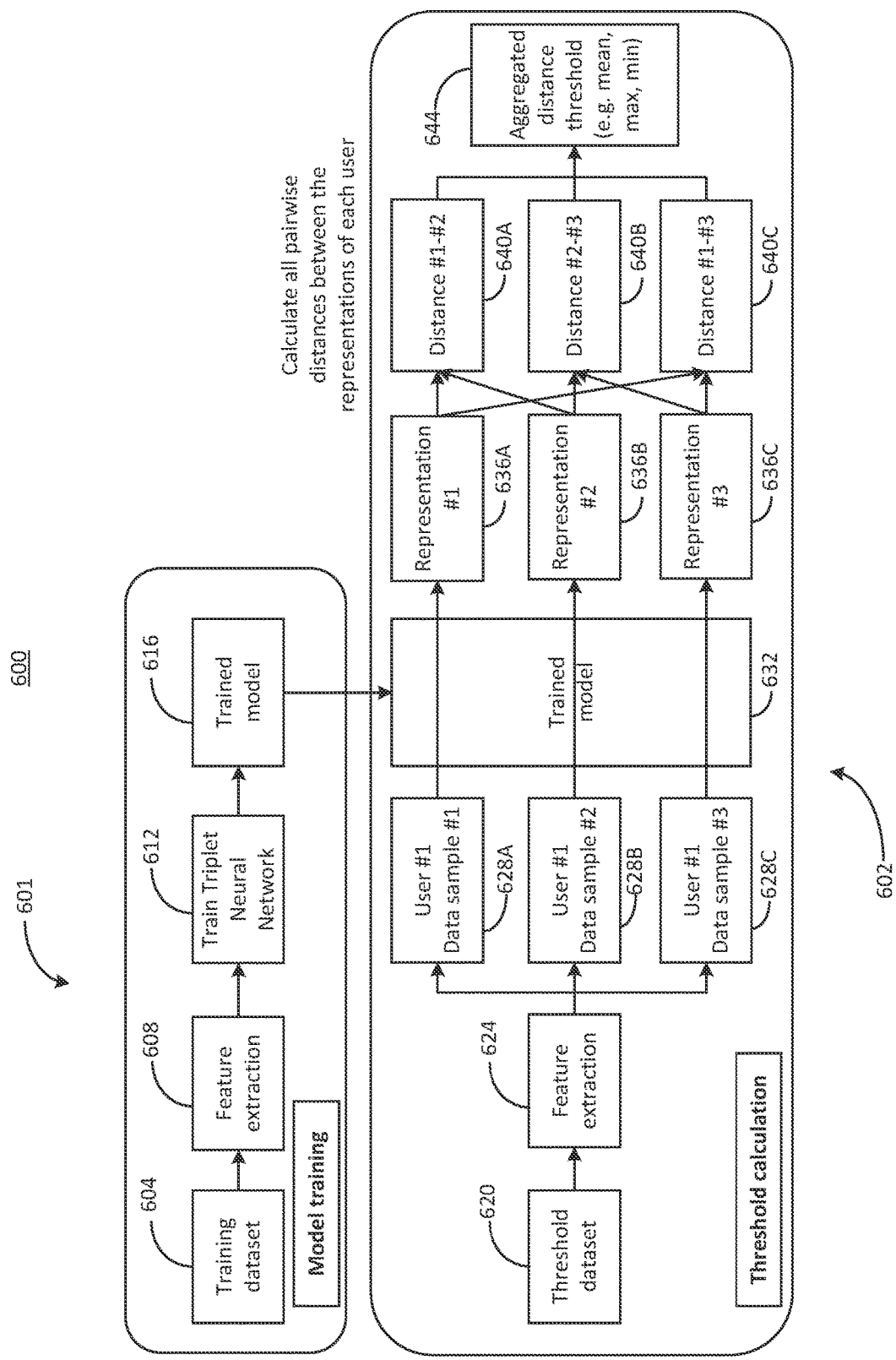
FIG. 6 is a flow diagram of an example method for determining personalized thresholds, in accordance with an implementation.

Referring to FIG. 6, a flow diagram 600 of an example method for determining personalized thresholds is shown, in accordance with an implementation. The acts in the flow diagram 600 can be performed by one or more systems or components depicted in FIG. 1 or FIG. 2, including, for example, the DPS 202 (e.g., system), analytics service 208, or the machine learning engine 212. The method of the flow diagram 600 can use dataset or data samples from a single user, as an example to determine a personalized threshold. The method can be performed to determine personalized thresholds for other users. The method can include model training 601 and threshold calculation 602. The model training 601 can train a model used to generate a personalized threshold in this example. For example, the system can retrieve training dataset 604 from a data repository. The training dataset 604 can be historical data of the user (e.g., multiple or all users). The system can perform feature extraction 608 using the training dataset 604. The system can use the extracted features as inputs to a triplet neural network 612. The output of the triplet neural network 612 can be the trained model 616. Other neural networks can be used to train a model or generate a trained model. The process of the triplet neural network 612 can be depicted in FIG. 5C. For example, the extracted features can be used as an anchor sample 544. Therefore, the system neural network can compare anchor representation 556B to both the positive representation 556A and the negative representation 556C to determine two distances between the representation pairs. The comparator 568 can be the trained model used to generate representations of different types of features.

For threshold calculation 602, the system can use a dataset different from the training dataset 604. This dataset can be referred to as a threshold dataset 620. For example, using the same dataset as the training dataset 604 can yield a low threshold since the model already learned the behaviors determined from the training dataset 604. Furthermore, the trained model may have overfitted the training set. This in turn can result in an increase in false positives (e.g., cases being reported as suspicious while they are not). Therefore, the system can select threshold dataset 620 different from the training dataset 604.

For each user in the threshold dataset 620, the system can calculate the same features used during training, with the same aggregation (e.g. per hour). For example, if the feature extraction 608 includes location, volume download, and volume upload, the feature extraction 624 can also include location, volume download, and volume upload as metrics for determining representations of the user. The system can group each type of feature into different data samples, such as samples 628A-C for three types of features. In some cases, the samples 628A-C can represent three combinations of various types of features. The combinations of features can be similar to the combination of features used in the model training 601. The system can feed each of the data samples 628A-C to the trained model 632. The trained model 632 can be the trained model 616 using the training dataset 604. The system, using the trained model 632, can output the representation (e.g., embedding) of each data sample. For example, the output can include representations 636A-C. For each user, the system can calculate all pairwise distances between their own representations. For example, the system can calculate distance 640A between representations 636A and 636B, distance 640B between representations 636B and 636C, and distance 640C between representations 636A and 636C. The distances 640A-C can represent how far each data sample is compared to other data samples of the same user (e.g., data samples 628A-C). The system can determine an expected future distance between a new data sample and the historical data samples of the user. The distances 640A-C can form a distribution. The system can aggregate the distances 640A-C into an aggregated distance 644. The aggregated distance 644 can be a threshold. The system can select a value within, e.g., or outside, the distribution as a threshold which can be used during inference. For example, the system can select the mean, maximum, or minimum, distance from the determined distances 640A-C. In some cases, the decision can be from an organization or an administrator of the system. The system can determine the threshold based on organization tolerance (e.g., security level) or bandwidth to investigate user suspicious activities. The higher the threshold, the lower behaviors of different users can be deemed suspicious.

The system can use the determined threshold as a base to determine a global threshold or a peer threshold. The global threshold can be used to allow access to any users with behavior below the global threshold, for example. The peer threshold can be used in a similar manner. In some cases, the system may not provide full access to a session if not all thresholds are met. For example, a user can present consistent behaviors. In this case, the personalized threshold of the user can be low. Therefore, subsequent actions or behaviors of the user that deviates from the common path (e.g., even slightly depending on how low the threshold is) can be reported as suspicious. Hence, this may lead to undesired alerts by the system. In this case, the system can use a global threshold to remove alerts when the current behavior is close to the historical behavior of the user, albeit above the personalized threshold of the user. To determine a global threshold, the system can calculate the pairwise distances 640A-C among the data samples 628A-C in the threshold dataset 620, for example. The system can categorize the distances 640A-C between distances of the same user and distances between different users. The system can determine a global threshold value based on the categorized distances that reflects a common behavior of users using an application. The peer threshold can be determined by the system using similar processes as determining the global threshold. The peer threshold can be applied to users using an application that is private among a group of users (e.g., employees within an organization). In some cases, the system can use the peer threshold to determine suspicious behavior among employees (e.g., insider threats).

Figure 7:
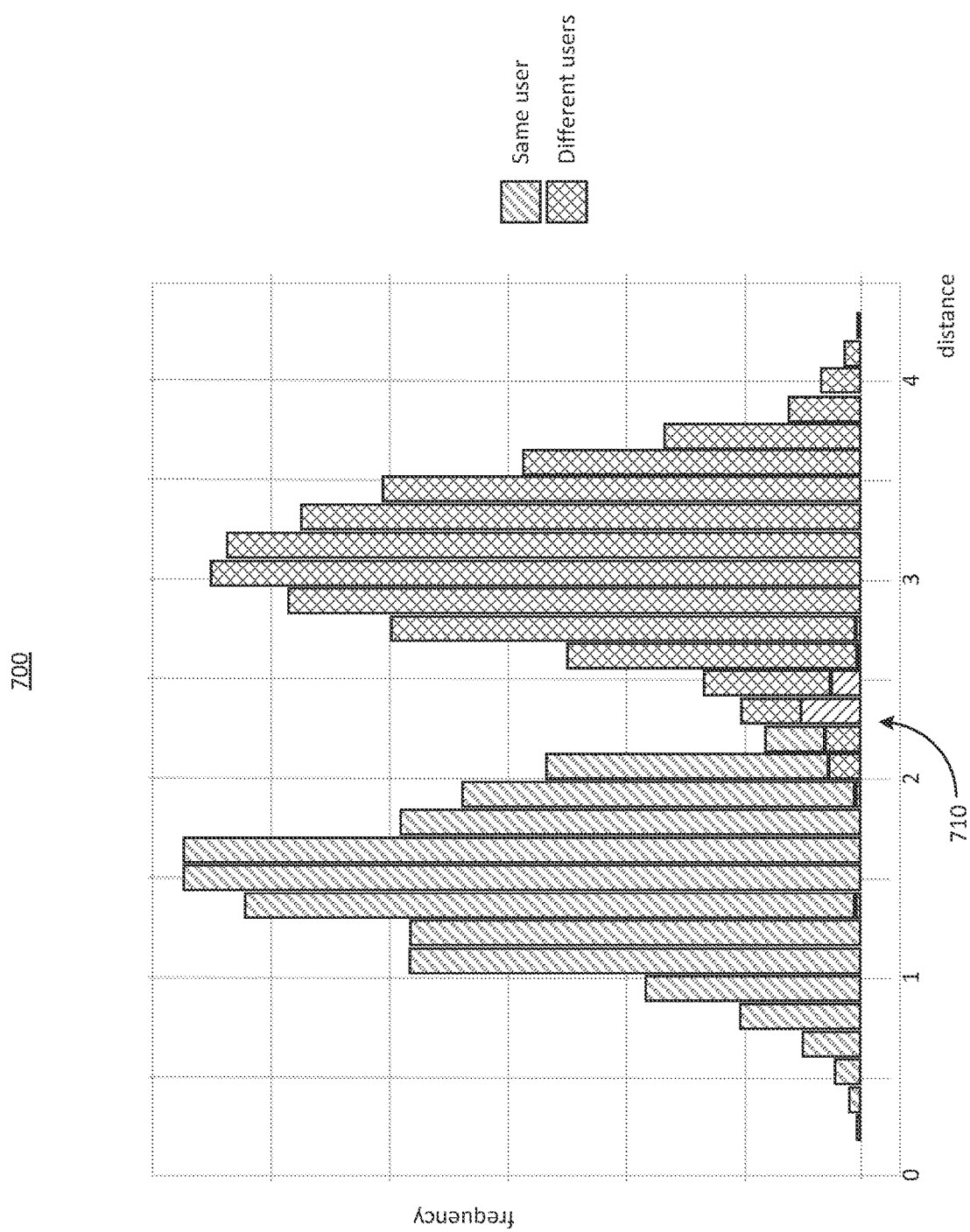
FIG. 7 is an example illustration of a graph including global and peer-based thresholds, in accordance with an implementation.

Referring to FIG. 7, an example illustration 700 of a graph including global and peer-based thresholds is shown, in accordance with an implementation. The global threshold or peer threshold can be in connection to FIG. 6, for example. The illustration 700 can represent a historical collection of distances determined from representations of a user and representations of at least one other user. The illustration 700 can include a distance range from 0 to 4.5. The frequency on the y-axis of the illustration 700 can represent the number of times the respective distance is determined from datasets of the user or the other user. The illustration 700, showing frequency versus distance of whether the session belong to the same user or different user, can be determined by using the training data for generating a threshold, for example. The illustration 700 can be used by an organization or an administrator of the system to determine a value to select for a global threshold or a peer threshold. For example, distances representing the same user can range from 0 to 2.75. Distances representing other user can range from 2 to 4.5, approximately in the illustration 700.

The administrator can select a threshold value (e.g., for global threshold or peer threshold) with the least frequent detection of different user within the distance range of detecting the same user, such as a distance of 2. The administrator can select a high threshold value where the same user can be detected, such as 2.75. The administrator can compromise and selected a threshold value between the two aforementioned distances (e.g., 2.25, 2.35, or 2.5). The administrator can select a threshold value based on a cross between the lowest number of detected same user distance and different user distance, such as at point 710. Based on the threshold value selected, the system can decrease the rate of false positives and false negatives, for example.

Figure 8:
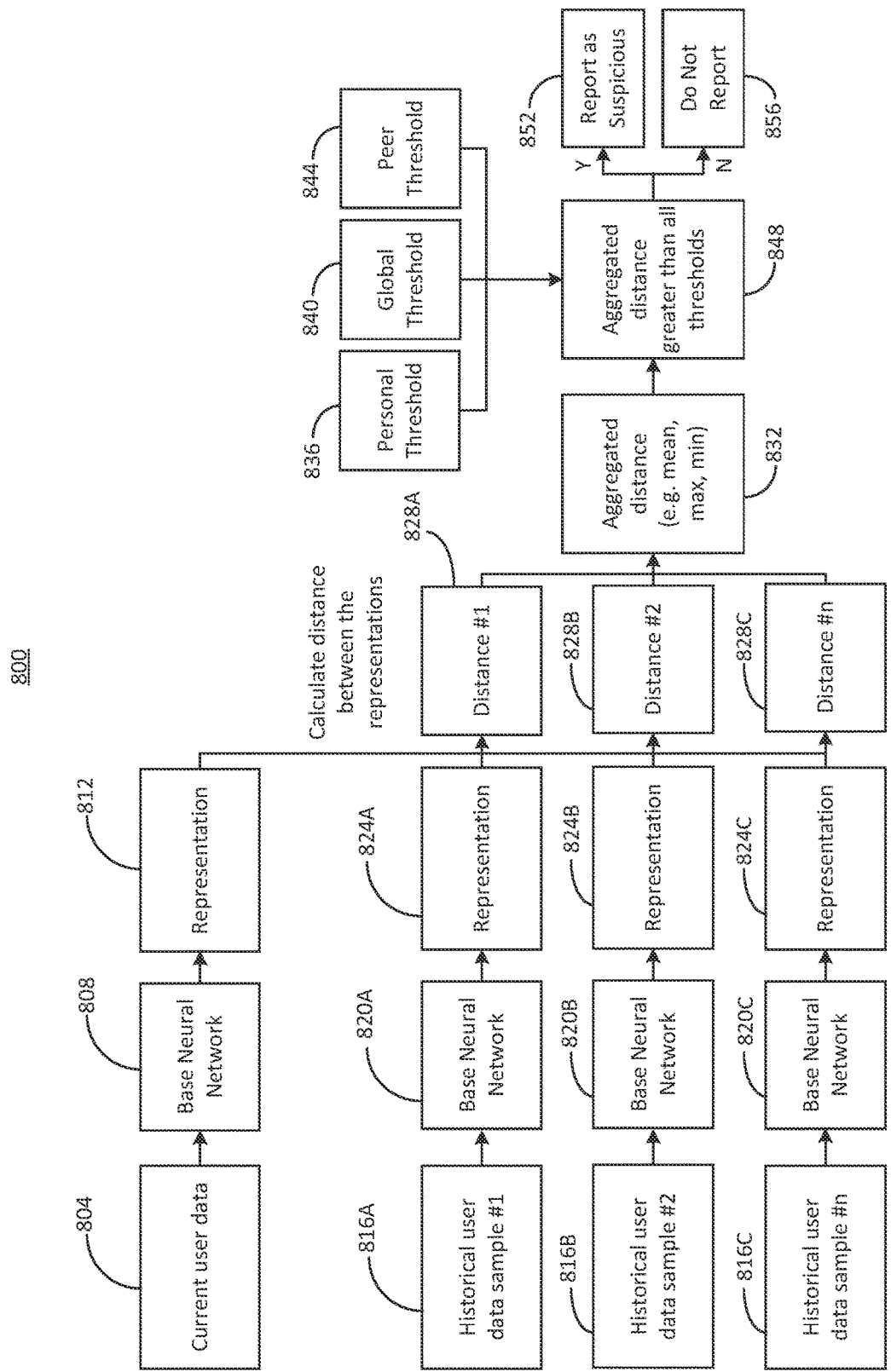
FIG. 8 is a flow diagram of an example method for decision making during inference, in accordance with an implementation.

Referring to FIG. 8, a flow diagram 800 of an example method for decision making during inference is shown, in accordance with an implementation. The acts in the flow diagram 800 can be performed by one or more systems or components depicted in FIG. 1 or FIG. 2, including, for example, the DPS 202 (e.g., system), analytics service 208, or the machine learning engine 212. The method can be performed in combination with one or more other methods previously described. In some cases, the previous methods described can refer to model training methods. The system can perform the method herein to make a decision during inference. For example, the system can receive new data from a new user. The new user may refer to a user that just signed up for an account to use on an application. The new user can refer to a current user that signed into an existing account to access a session. The system can store historical data of a session of the new user for determining the user behavior in other sessions. The system can determine if the behavior of the new user is suspicious enough (e.g., compared to at least one threshold) to report to an administrator or the organization. The administrator can control the system and the application, such as provide updates, configure, or otherwise manage the system and the application.

The diagram 800 can refer to a single user having new data during a timeframe, such as an hour. The system can receive new data for multiple users for processing in parallel to determine whether each user is suspicious. The new data can be the current user data 804. The system can feed the current user data 804 (e.g., after feature extraction) to a trained model, such as feeding the data to the base neural network 808. The base neural network 808 can output a representation 812 of the current user data 804. The representation 812 can be for the session accessed by the user via a device. The representation 812 can be referred to as a current representation.

Parallel to generating the current representation, the system can generate multiple historical representations for comparison with the current representation. For example, the system can retrieve historical user data samples 816A-C. The historical samples 816A-C can be from datasets not used during training, such as the threshold dataset 620, or any historical data not used during training. The system can input the historical user data samples 816A-C to corresponding base neural networks 820A-C, each of which can be similar to the base neural network 808 used to determine the current representation. The system can generate representations 824A-C using the historical user data samples 816A-C. The representations 824A-C can be referred to as historical representations 824A-C. The system can retrieve additional historical user data samples for comparison with the current threshold to improve the accuracy of the resulting aggregated distance 832, for example. In some cases, the historical representations 824A-C can be pre-computed and stored in a data repository or a database. Using pre-computed data, as in this example, can decrease the inference time.

The system can compare the current representation 812 generated from the base neural network 808 against other historical representations 824A-C of the user (e.g., or the representations for an expected user). The system can calculate distances 828A-C between the new sample and each of the historical samples 816A-C. The system can aggregate the distances to a single distance (e.g., value or number). The single distance can be referred to as an aggregated distance 832, which can be the maximum, the minimum, or the mean of the distances 828A-C, for example. The administrator or a designer of the system can configure the aggregation method. The aggregation method can be similar for determining the personalized threshold based on distances determined from training representations. For instance, if a threshold is determined using a maximum aggregated distance, the system can use the maximum of the distances 828A-C for the aggregated distance 832. The same can apply for threshold with minimum or other aggregation methods. The system can compare the aggregated value or distance 832 to a personalized threshold 836 of the user, a global threshold 840, and the peer threshold 844. The system can compare the aggregated distance 820 to at least one of the aforementioned thresholds (e.g., based on their existence). The system can perform the comparison at block 848.

Subsequent to the comparison, the system can determine if the aggregated distance is greater than the one or more thresholds. For example, if the aggregated distance 832 is higher than all thresholds, the system can report the user as suspicious to the administrator at block 852. The distance 832 being higher than all thresholds 836, 840, and 844 can indicate that the user current behavior is far from their own historical behaviors (e.g., at least than the system expected if the behavior was normal). In some cases, the system can report a suspicious behavior 852 if the aggregated distance 832 is greater than at least one of the thresholds 836, 840, or 844.

The system can determine not to report 856 suspicious activities by the user if the distance 832 is less than all the thresholds 836, 840, and 844. In some cases, the system may not report 856 if the distance 832 is less than any of the thresholds 836, 840, and 844. In some other cases, if the distance 832 is greater than at least one of the thresholds 836, 840, and 844, the system may restrict certain features of the application or within the session accessed by the user of a device.

Figure 9:
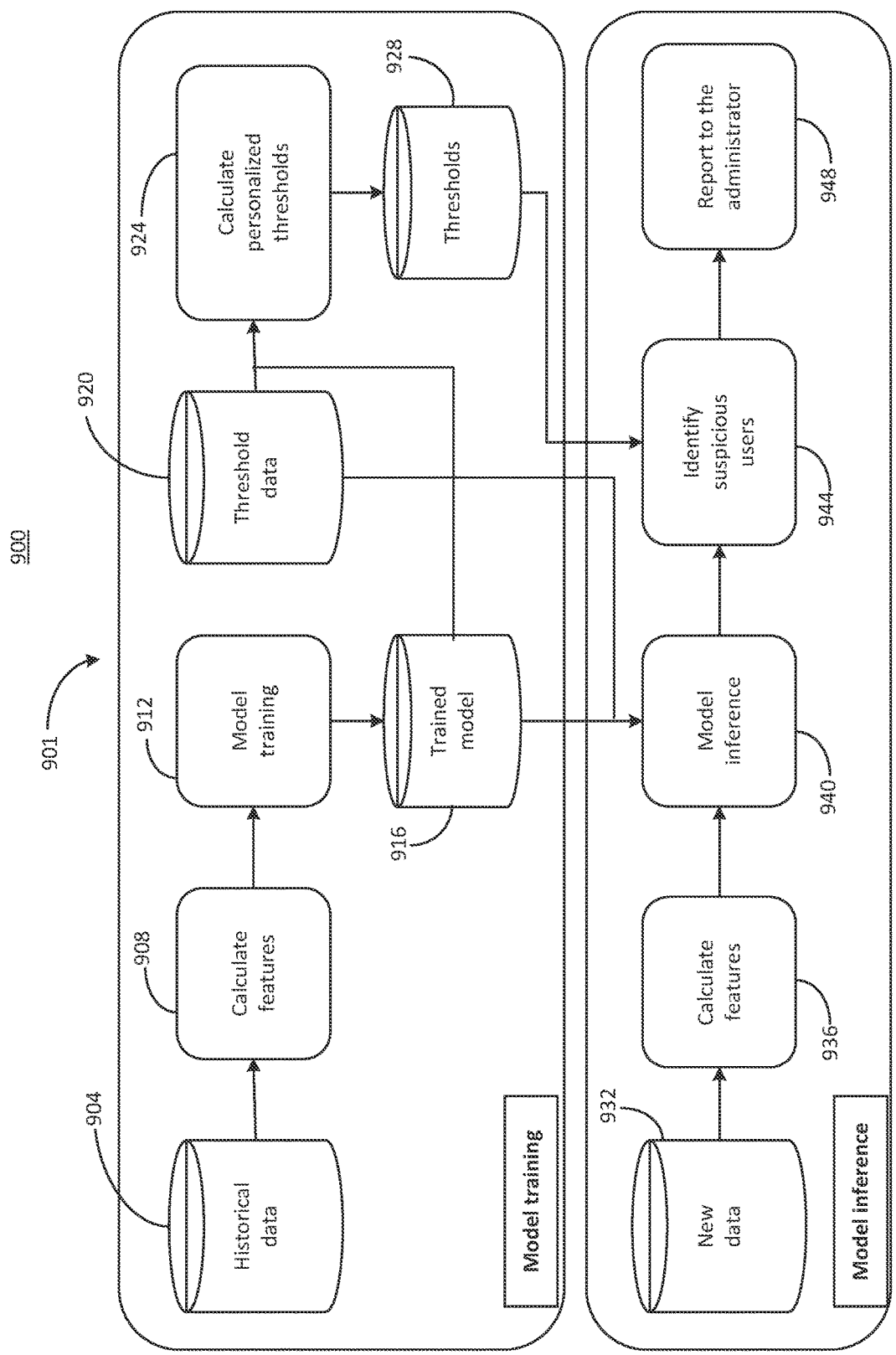
FIG. 9 is a flow diagram of an example workflow of model training and model inference, in accordance with an implementation.

Referring to FIG. 9, a flow diagram 900 of an example workflow of model training and model inference is shown, in accordance with an implementation. The acts in the flow diagram 900 can be performed by one or more systems or components depicted in FIG. 1 or FIG. 2, including, for example, the DPS 202 (e.g., system), analytics service 208, or the machine learning engine 212. The flow diagram 900 can show a high-level view of at least part of the system workflow. The line between the components within the diagram 900 (e.g., between the threshold data 920 and the model inference stage 902) can refer to the calculation of the representations of the historical samples not used during training. The historical samples can refer to historical data 904. The model training and the threshold calculation pipeline can be executed at every given cycle, such as 10 minutes, 30 minutes, or an hour), thereby keeping the trained model up to date, as users may change their behavior over time. The system can update the personalized thresholds of each user, such as every day or a week. During model inference 902, each new sample or new data 932 can be compared against recent historical samples of the user. Hence, the system can leverage the user most recent behavioral patterns.

The one or more components of the system can perform model training 901 and model inference 902. For example, for model training 901, the system can retrieve historical data 904 from a data repository stored in the system or in the cloud service. The system can calculate the features 908 using the historical data 904. The system can feed the calculated features 908 into a Neural Network, a machine learning component, or a deep learning component for model training 912. The Neural Network can output a trained model 916 which can be stored in the data repository. The system can include threshold data 920, such as threshold data samples or datasets. The system can calculate at least a personalized threshold 924, a global threshold, or a peer threshold using the threshold data 920. The system can select at least one of the thresholds 928 stored in the data repository for comparison with the distance of the user.

The system can perform model inference 902. For example, the system can receive new data 932 from a user. The new data 932 can be stored in the data repository and retrieve for analytical purposes. The system can calculate the features 936 of the new data 932. The features can be similar features as the calculated features 908 from the model training (e.g., for side-by-side comparison). The system can perform model inference 940 to determine representations from the calculated features 936. The system can compare each representation to another representation to determine a distance between them. The system can aggregate the distances between the representations to determine a final distance of the user based on the new data 932. The final distance can be referred to as a distance value of a current user. The system can identify suspicious users 944 by comparing the final distance to at least one of the thresholds 928. The system can report to an administrator 948 if the user is suspicious. If not, the system can continue to monitor the user behavior and compare the representations from the new data 932 to subsequent data received by the system from the device of the user.

Figure 10:
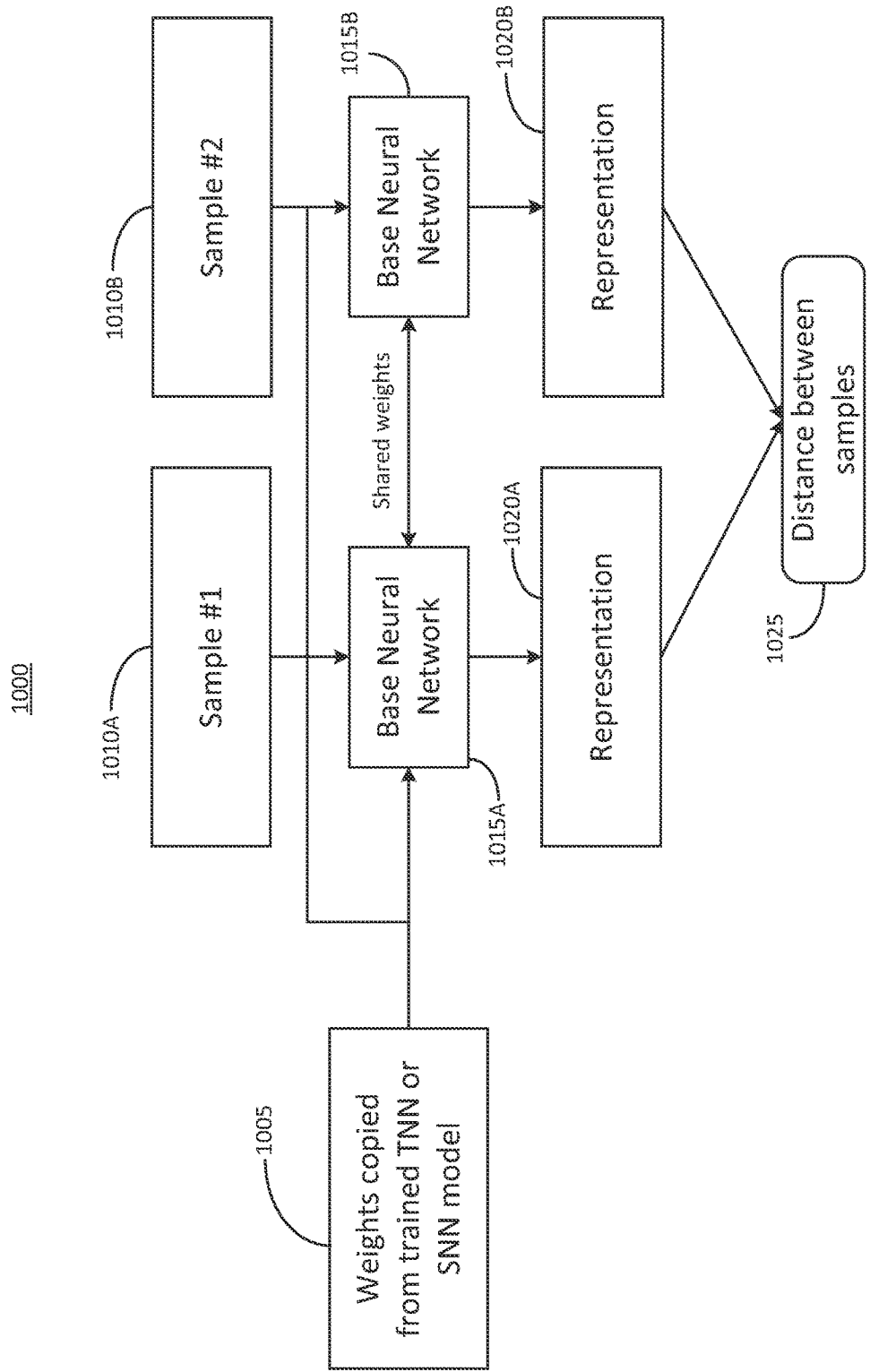
FIG. 10 is a flow diagram of an example method for model interpretability modeling, in accordance with an implementation.

Referring to FIG. 10, a flow diagram 1000 of an example method for model interpretability modeling is shown, in accordance with an implementation. The acts in the flow diagram 1000 can be performed by one or more systems or components depicted in FIG. 1 or FIG. 2, including, for example, the DPS 202 (e.g., system), analytics service 208, or the machine learning engine 212. The diagram 1000 can relate to diagram 300. The method for model interpretability modeling can be used in connection to the method 500C, such as to determine a distance between samples 1025. For example, the system can retrieve two data samples 1010A-B of a user. The samples 1010A-B can be from different users to determine the distance between the different users. The system can feed the samples 1010A-B into the base neural networks 1015A-B, respectively. By feeding the samples 1010A-B, the system can feed features extracted from the samples 1010A-B. The neural networks 1015A-B can include shared weights. The shared weights can be copied from a trained TNN or SNN model 1005, for example. The system can generate respective representations 1020A-B from the output of the neural networks 1015A-B. The system can compare the representation 1020A against the representation 1020B, in this case, to determine a distance between the samples 1025. The distance can indicate how far the first sample 1010A is from the second sample 1010B (e.g., behavior, action, numeric value, or sequence of events).

Figure 11:
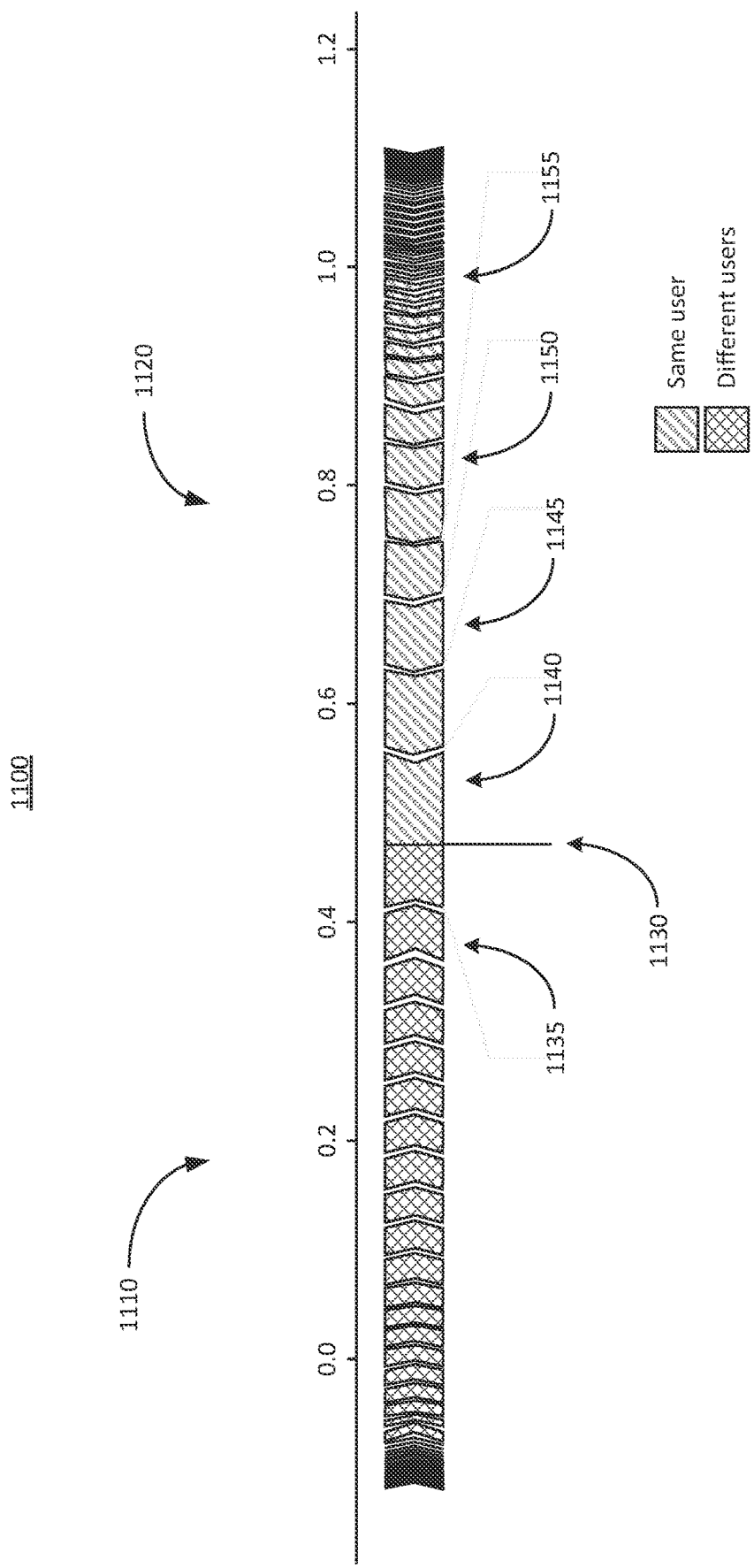
FIG. 11 is an example illustration of a model interpretability, in accordance with an implementation.

Referring to FIG. 11, an example illustration 1100 of a model interpretability is shown, in accordance with an implementation. The example can illustrate model prediction of distances between each sample. The distance used in this case can range from −0.1 to 1.1 (e.g., or 0 to 1 for the purposes of this example). In this example, higher distances can indicate to similar behaviors based on new user data and historical user data while lower distances can indicate a larger difference between the user behavior and expected user behavior. For example, side 1110 can represent suspicious behavior and side 1120 can represent expected behaviors of the user. The two sides can be separated at point 1130.

For example, the user can utilize distinct tools 1135 within a session. The distinct tools 1135 can indicate software, program, or features of the application the user does not commonly use, if at all. Therefore, the behavior of the user using the distinct tools 1135 can land on the suspicious side 1110 (e.g., action of a different user), at a distance of approximately 0.4. On the other hand, the system can record a sequence of locations of the user, such as locations 1140, 1145, 1150, and 1155. Each of the locations 1140, 1145, 1150, and 1155 may be previously recorded by the system, indicating a common user behavior. Therefore, the location features may not be suspicious (e.g., from the same user), as presented on side 1120. In some cases, the distinct tools 1135 and locations 1140, 1145, 1150, and 1155 can be paired with other features to determine whether they are actions from the same user or different users.

The systems and methods referred to in at least FIGS. 4D-11 can be in connection to each other. For example, the methods of FIG. 5C can be used in association or with the methods of FIG. 6. The methods described thereof can facilitate other methods to determine at least the representations of the extracted features, the distance of the user behavior, the thresholds, and suspicious behavior by the users (e.g., compromised account, insider threats, data breach, among others). One or more other components, in addition to components of system 200, can be utilized to facilitate the systems, methods, and apparatus discussed herein, such as used in at least FIGS. 4D-11, for example.

Figure 12:
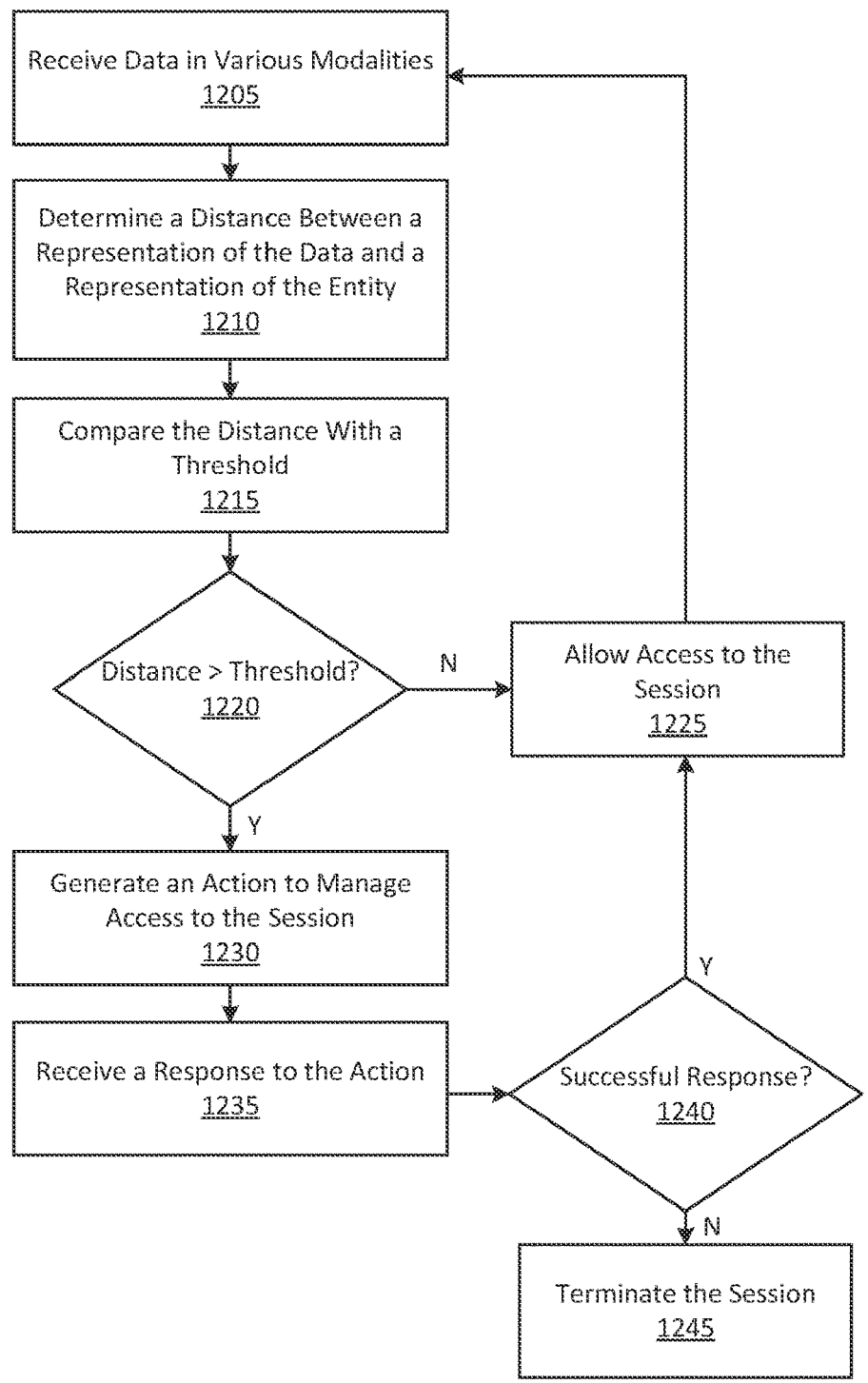
FIG. 12 is an example flow chart of an example method for managing session access, in accordance with an implementation.

Referring to FIG. 12, an example flow chart 1200 of an example method for managing session access is shown, in accordance with an implementation. The flow chart 1200 can represent a method for identifying suspicious users accessing an application via the session. The steps in the flow diagram 1200 can be performed by one or more systems or components depicted in FIG. 1 or FIG. 2, including, for example, the DPS 202, analytics service 208, or the machine learning engine 212. The example method of flow chart 1200 can be performed or operated by one or more components or elements as in FIGS. 1 and 2. The features and functionalities of the one or more components or elements, such as described at least in FIGS. 1-3 and 4D-11, can be reflected or incorporated herein, for example. In brief overview, a system can receive data in various modalities, at step 1205. At step 1210, the system can determine a distance between a representation of the data and a representation of the user. At step 1215, the system can compare the distance with a threshold. At step 1220, the system can determine if the distance is greater than or equal to the threshold. At step 1225, the system can determine to allow access to the session. At step 1230, the system can generate an action to manage access to the session. At step 1235, the system can receive a response to the action. At step 1240, the system can determine if the response is successful. At step 1245, the system can terminate the session.

Still referring to FIG. 12, in more detail, the system can receive data in various modalities, at step 1210. The modalities can correspond to multiple features received by the system during a session. The session can be created by an application server for using features within an application. The system can include at least one or more processors and at least one memory.

The modalities can include at least one of numeric data, categorical data, image data, sound data, a sequence of data, or a combination of at least two of the plurality of modalities. The modalities can be referred to as groups or types of features. For example, the numeric data can include download volume, upload volume, a number of files/folders download/upload, or the size of client device storage. The categorical data can include text information, locations of the user, network connection information, a category of contents displayed on the client device, or other events. The sequence of data can include a sequence of at least the numeric data, the categorical data, the image data displayed on the client device, or the sound data played on the client device. The system can use a combination of modalities to determine a distance between the current user session and the historical user session (e.g., historical profile). For example, the system can combine location modality with download volume or network connection information with upload volume to determine if the user follows a common behavioral path.

The features can be extracted from data samples, datasets, a cluster of data received by the system. The features can include at least one of a number of files downloaded, uploaded, deleted, or updated, a file type, a file size, a download duration, a location of the client device, a timestamp, a download volume over a predetermined time interval, a number of system events, an event type (e.g., mouse click, instructions received by the system, information transmitted by the system, or other data intercommunication to or from the system), an IP addresses, a number of IP addresses, an operating system, a browser version, or a sequence of electronic remote procedure calls, among others described above. The system can use the features extracted from current data from the user to generate representations of the features via a machine learning engine. The machine learning engine can use a trained model to generate the representations. The machine learning engine can train the model using similar modalities of features as the extracted features. In some cases, the system can determine to extract features from the current data based on the features that are used to train the model.

The representation can represent a summary of at least one feature. For example, the system can generate a first representation for a sequence of user locations, a second representation for a volume of downloads, and a third representation for tools executed by the client device during the session. The representations can be aggregated into a single representation summarizing the behavior of the user based on the combined modalities of features. In some cases, the features (e.g., or modalities of features) extracted from the current user data can be used as a single dataset. The system can generate a single representation summarizing the behavior of the user in view of all features extracted from the current user data. A similar process can be done to determine at least one representation from historical data.

The current representation of the user can be compared to at least one historical representation of the user. The user of the current representation can be the same user as the user of the historical representation (e.g., to detect insider threat). The user of the current representation may not be the same user as the user of the historical representation (e.g., determine if an account is compromised or not a different user is using the account).

The system can identify that the session is provided by a cloud storage service hosted by one or more servers. For example, the cloud storage service can generate or create a session for a user to access. The system can manage the session along with other sessions for other users using the cloud storage service. The system can be an intermediary device between the client device and the one or more servers. In some cases, the one or more servers can include one or more components, features, or functionalities, similar to the system. The servers in that case can manage and detect suspicious users operating on corresponding cloud storage services. Using the system as an intermediary device, the system can collect and analyze information exchanged between the client device and the one or more servers. For example, the cloud storage service can receive a request to download files from a device. The system can receive the request, as well as other information recorded by the client device, such as location data or network connection data. The cloud storage service can receive the request from the client device and transmit the file as a response. The system can determine the download volume, in this case. The system can perform similar procedures for other information exchange between the client device and the cloud storage service or other services hosted by the one or more servers.

At step 1210, the system can determine a distance between a representation of the data of the session and a predetermined representation for the user established based on the historical data for the user. The system can determine the distance based at least in part on the data of the session for the user and a distance model trained with historical data of the user that accounts for cross-modal correlations between the various modalities. In some cases, the distance model can be trained using data from other users or a combination between the same user and different users. The distance model can refer to the trained model used to determine the distance between representations of the user. The representation of the data of the session can refer to a current representation of a current user using the client device to access the session. The predetermined representation can be a historical representation of the user. The historical representation can be pre-stored in a data repository of the system prior to model inference (e.g., before the representation for the current user data is generated). The current user data can refer to data of the session. The predetermined representation can refer to historical representation.

The current representation can be compared to multiple historical representations to determine two or more distances between each pair of current representation and historical representation. For example, the current representation can be compared to a first historical representation and a second historical representation. The system can determine a first distance and a second distance based on the corresponding paired comparisons. The system can aggregate the first distance and the second distance to determine a single distance that represents the current data of the user compared to historical data of the user (e.g., summarizing the current behavior to previously recorded behavior of the expected user). The system can determine an aggregation method to use, such as using the mean, min, max, or median of the first distance and the second distance, for example. The aggregation method can be configured by an administrator of the system or of the application that created the session. The aggregation method can be similar to the aggregation method used during model training or threshold determination.

For example, the trained model can use maximum distances as a training distance dataset. Therefore, the system can use the maximum distance between the first distance and the second distance. Other aggregation methods can apply. In another example, if a personalized threshold is determined using an averaged distance between distances determined from comparing representations of the same user, the system can use the averaged distance between the first distance and the second distance. The term first, second, or third is not limited to each element described herein, and can be replaced based upon the number of elements described using other interchangeable terms, such as original, last, previous, final, among others.

The system can account for cross-modal correlations between various modalities. Cross-modal correlations can refer to different combinations of modalities. For example, the system can determine a representation for a numeric modality and a categorical modality. With each modality, feature, or cross-modal correlation used during training of a model, the same can apply to the modality, feature, or cross-modal correlation used to determine the distance of the user compared to historical representations.

The distance can represent how far the user behavior is from the historical user behavior or previous user behavior. The system can use multiple distances for comparison with at least one threshold to determine whether the user is suspicious. For example, the system can determine a distance of the current user every predetermined cycle, such as 30 minutes or 1 hour. The system can compare the distance to a threshold every cycle. The system can use the representations used to determine the distance in the next cycle, such as to determine the next distance of the current user. Therefore, the distances of the user in a timeframe, such as a day, can be determined and used to compare with the threshold as an overall distance. The overall distance of the user can indicate whether the user is suspicious or not.

The system can access a data repository storing multiple distance models. For example, each distance model can correspond to a respective account. More than one distance model can be used for each account, depending on the devices used to access the account. For example, the account can be accessed by a first device (e.g., mobile device) and a second device (e.g., desktop). The system can use a first model for the first device used to access the session, and a second model for the second device. The first model can account for the locations of the user and the second model can account for additional information of the user related to the desktop device, such as network connection. Each model can correspond to a group of modalities, such that any modalities can be used during distance calculation. The system can use at least one model for multiple users. The system can select the distance model from the data repository.

The system can train each model using historical data from one or more users. The system can train the model using a distance-based loss function. The loss function can be configured to predict relative distances between inputs for the user. The relative distances can indicate how comparable or how different inputs are to their historical inputs. Therefore, the distances can indicate the consistency or inconsistency of a user behavior.

The historical data for the user can include a first modality, a second modality, and a third modality. The first modality, the second modality, and the third modality can be from a group of modalities stored in the data repository. The system can input the historical data in the first modality into a first neural network to generate a first output. The system can input the historical data in the second modality into a second neural network to generate a second output. The system can input the historical data in the third modality into a third neural network to generate a third output. The first neural network, the second neural network, and the third neural network can share similar weights (e.g., parameters and modalities used for training). The first neural network, the second neural network, and the third neural network can include at least one of FCNN, RNN, GRU, or CNN as the neural network. For example, for numeric features as a modality, the system can use an FCNN to generate an output. For sequential modality, the system can use an RNN to generate an output. The system can concatenate the first output, the second output, and the third output to generate a concatenated output. The concatenation can be done in a concatenate layer. The system can input the concatenated output into a fourth neural network, such as FCNN, to generate the representation for the user. The representation can be a predetermined representation or a historical representation stored in the data repository. This process can be a part of a base Neural Network architecture to determine a representation from different modalities as inputs.

The system can input the data into the distance model to generate the representation. The system can identify a first historical representation based on a first data sample of the historical data input into the distance model. The system can identify a second historical representation based on a second data sample of the historical data input into the distance model. The system can identify a third historical representation based on a third data sample of the historical data input into the distance model. These representations can be determined by the system. Each data sample, including the first data sample, the second data sample, and the third data sample, can refer to extracted features. In some cases, the data samples can be raw data and the system can extract the features or modalities of features from the raw data. The system can determine a first distance between the representation (e.g., current or new representation determined from new data of the user) and the first historical representation. The system can determine a second distance between the representation and the second historical representation. The system can determine a third distance between the representation and the third historical representation. The system can aggregate the first distance, the second distance, and the third distance to determine an aggregated distance. The aggregated distance can be used as the threshold, in some cases. The aggregation method used for the aggregated distance can be similar to the aggregation method used for determining a threshold value.

At step 1215, the system can compare the distance with a threshold established for the user. The threshold can include at least one of a user threshold (e.g., personalized threshold), a global threshold, and a peer threshold. Once the comparison is performed, the system can move to step 1220. The system can establish the threshold used for the comparison. The threshold can be calculated for the user based on a distribution of pairwise distances. The pairwise distances can be between representations output by a model trained for the user based on the historical data. For example, the system can input a threshold dataset into a machine learning engine. The system can extract features or modalities of features into different data samples. The system can determine the number of data samples to generate based on the features or modalities available from the threshold dataset. The system can input the data samples into the model to generate corresponding representations. If there are three data samples, the system can generate three corresponding representations. The system can compare the representations against each other to calculate all pairwise distances among the representations. The representations can belong to a single user to determine a personalized threshold for the user.

The threshold can represent the consistency or inconsistency of the user behavior. The user can be an account owner, for example. In some cases, multiple users can use the same account. The behavior between the users may not be close in distance, though not suspicious. Therefore, the system can determine a higher threshold for the account owner with inconsistent behavior, such as an account used by multiple authorized users. However, at least one of the user can be an insider threat. Therefore, the system can compare the distance of the user to other thresholds, such as a peer threshold, to determine any suspicious behavior as configured by an organization or an administrator. For example, the user distance can be lower than a personalized threshold (e.g., determined based on combined behaviors of the users). However, if the distance of the user is greater than a peer threshold, the system can take appropriate action to address the suspicion.

At step 1220, the system can determine if the distance is greater than or equal to the threshold based on the comparison of step 1215. For example, if the distance is greater than or equal to the threshold, the system can perform step 1230. If not, the system can perform step 1225.

The system can determine that the distance of the user is greater than or equal to at least one threshold, such as the personalized threshold, the global threshold, or the peer threshold. The system can perform step 1230 if the distance is greater than or equal to any one of the thresholds. The system can perform step 1230 if the distance is greater than or equal to all the thresholds. The system can perform step 1225 if the distance is less than at least one of the thresholds. The system can perform step 1225 if the distance is less than all the thresholds. These determinations can be configured by the administrator of the system.

The system can determine that the distance is greater than or equal to zero and is less than the threshold for the user. For example, if the distance is greater than or equal to zero, the system can determine that the distance value is valid using the user data. However, if the distance value is less than zero, such as any negative number, the distance may be invalid, and the system can perform re-calculation of the distance. In some cases, the distance can fall below zero based on the configuration of distance calculation and threshold calculation.

At step 1225, the system can determine to allow access by the client device to the session for the user. Allowing access to the session can refer to not terminating the existing session access by one or more client devices. By allowing access to the session, the system can continue to monitor the user behavior. The system can continue to collect information from the client devices. The user provided consent for the system to collect information from the client devices. The system can allow access responsive to determining that the distance of the user is less than the threshold.

The system can allow access if the distance is less than at least one of the thresholds. For example, the distance can be greater than a global threshold of an application. However, the distance can be lower than the personalized threshold. Therefore, the system can allow access to the session responsive to the distance being less than the personalized threshold, such as with a user with inconsistent behavior. The system can automatically allow access to user with a distance less than all the thresholds. In some cases, actions performed based on the distance being less than or greater than a threshold can be relative to the calculation of the distances. If higher distance represents more similar behavior, then the system can allow access if the distance is greater than or equal to the threshold, as in this example.

The system can allow access to the session responsive to successful response from the user at step 1240. For example, the distance of the user can be greater than or equal to the threshold. The system can take an action to manage access to the session, as in step 1230. The action can include transmitting an additional request for credentials. The system can receive a response to the request, as in step 1235. If the response is successful, as in step 1240, the system can allow the user to access the session. The system can store the current representation used to determine the user distance as a new historical representation. The system can use the new historical representation to compare with the next representation generated by the next data set from the user. The system can perform step 1205 afterward, such as continuing to monitor the user behavior.

At step 1230, the system can generate an action to manage access by the client device to the session for the user. The action can be based at least in part on the comparison between the distance with the threshold. For example, if the distance of the user is greater than or equal to the threshold, the system can report suspicious behavior to the administrator. The action may be referred to as an instruction. The instruction can be stored and retrieved from the data repository of the system.

For example, after determining that the distance is greater than or equal to the threshold, the system can select at least one action based at least in part on a security policy associated with the session. The action can include at least one of the following. The action can include requesting the user for multifactor authentication (e.g., or additional authentication method different from account login). The action can include terminating the session accessed using the client device. The action can include recording the session. The action can include locking an account of the user to prevent subsequent access to the session. The account can be locked for a predetermined period (e.g., 1 day, 3 days, or a week) or until the administrator unlocks the account. The action can include transmitting a push notification to one or more client devices associated with the user. The user can respond to the push notification received on the one or more client devices. The action can be determined based on how far the distance is from the threshold.

For example, given a range of distances from 0 to 10, with the threshold set at 5, if the distance is 6, the system can transmit a notification to the one or more client devices associated with the user. Associated with the user can refer to the client devices that are owned by the user, such as previously used to access a session of an application. If the distance is 7, the system can request additional credentials from the user. If the distance is 8, the system can terminate the existing session and notify the one or more client devices associated with the user. If the distance is 9 (e.g., a value of 4 above the threshold), the system can lock the account and notify both the administrator and the client devices of the user. In some cases, the system can be configured with a tolerance range of distance from the threshold. For example, if the distance is equal to the threshold, the system may not report that there is suspicious activity.

The system can flag a session as malicious if the distance is greater than each of the user threshold, the global threshold, and the peer threshold. For example, since the distance is greater than all the thresholds combined, the system can determine the user is suspicious and does not follow a path typical of a common user. Therefore, the system can perform the response action to the malicious attempt at accessing the session. By flagging the session, the system can also terminate the session, lock the account, or perform other actions to prevent malicious intent.

In some cases, the system may not take action if the distance is less than at least one threshold. Instead, the system can continue to monitor the user behavior by collecting new data received from the client device. For example, the distance of the user can be greater than the personalized distance. However, if the distance is less than the peer distance associated with the application (e.g., common behavior of employees using the application), the system may not perform the actions above and continue to monitor the user behavior.

At step 1235, the system can receive a response to the action. For example, the system can transmit an additional request for credentials to the client device. The user can provide a response to the request via the client device. The system can then receive the response. The response may or may not be successful. Based on the success of the response, the system can perform different actions.

At step 1240, the system can determine if the response is successful. For example, if the response is successful, the system may not notify the administrator and perform step 1225 responsively. However, if the response is not successful, the system may perform step 1245. Other steps or actions can be performed if the response is not successful. The response can include techniques for identifying the user identity, such as username and password, email confirmation, push notification confirmation, or an input code from multifactor authentication.

At step 1245, the system can terminate the session. The system can determine to terminate a session response to an unsuccessful response, such as incorrect passcode or password. In some cases, the system can transmit another request for credentials in response to an unsuccessful response. However, after a predetermined number of unsuccessful responses (e.g., three times or five times), the system can proceed to terminate the session. With terminating the session, the system can perform additional actions as described in the previous steps. For example, the system can notify the administrator of the suspicious user. The system can send push notification notifying the expected user via one or more client devices associated with the user. However, if the user is the same as the expected user but still posed suspicious behavior, the system may not notify the user, instead just the organization or administrator. The system can suspend or lock the account subsequent to the termination. The system can unlock the account responsive to a predetermined time or by instructions from the administrator based on the security policy.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

I claim:

1. A method of managing a session accessed by a client device, comprising:
   receiving, by one or more processors, data in a plurality of modalities corresponding to a plurality of features of the session for an entity accessed by the client device;
   determining, by the one or more processors based at least in part on the data of the session for the entity and a distance model trained with historical data of the entity that accounts for cross-modal correlations between the plurality of modalities, a distance between a representation of the data of the session and a predetermined representation for the entity established based on the historical data for the entity;
   comparing, by the one or more processors, the distance with a threshold established for the entity; and
   generating, by the one or more processors based at least in part on the comparison between the distance with the threshold, an action to manage access by the client device to the session for the entity.

2. The method of claim 1, comprising:
   identifying, by the one or more processors, that the session is provided by a cloud storage service hosted by one or more servers, and the one or more processors are intermediary to the client device and the one or more servers, wherein:
   the plurality of modalities comprise at least one of numeric data, categorical data, image data, sound data, a sequence of data, or a combination of at least two of the plurality of modalities, and
   the plurality of features comprise at least one of a number of files downloaded, a number of files uploaded, a number of files deleted, a number of files updated, a file type, a file size, a download duration, a location of the client device, a timestamp, a download volume over a predetermined time interval, a number of system events, an event type, an IP addresses, a number of IP addresses, an operating system, a browser version, a device name, or a sequence of electronic remote procedure calls.

3. The method of claim 1, comprising:
   accessing, by the one or more processors, a data repository storing a plurality of distance models corresponding to a plurality of entities; and
   selecting, by the one or more processors from the data repository, the distance model for the entity from the plurality of distance models.

4. The method of claim 1, comprising:
   establishing, by the one or more processors, the threshold for the entity based on a distribution of pairwise distances between representations output by a model trained for the entity based on the historical data.

5. The method of claim 1, comprising:
   determining, by the one or more processors based at least in part on the comparison, that the distance is greater than the threshold; and
   selecting, by the one or more processors responsive to the distance greater than the threshold, the action based at least in part on a security policy associated with the session, the action comprising at least one of:
   a request for multifactor authentication,
   terminating the session,
   recording the session,
   locking an account of the entity to prevent subsequent access to the session, or
   transmitting a push notification to one or more client devices associated with the entity.

6. The method of claim 1, wherein the threshold comprises an entity threshold, a global threshold, and a peer threshold, comprising:

determining, by the one or more processors, that the distance is greater than each of the entity threshold, the global threshold and the peer threshold; and flagging, by the one or more processors responsive to the distance being greater than each of the entity threshold, the global threshold and the peer threshold, the session as malicious.

7. The method of claim 1, comprising:

determining, by the one or more processors, that the distance is greater than zero and less than the threshold for the entity; and allowing, by the one or more processors responsive to the determination, access by the client device to the session for the entity.

8. The method of claim 1, comprising:

training, by the one or more processors, the distance model with the historical data for one or more entities using a distance-based loss function configured to predict relative distances between inputs for the entity.

9. The method of claim 1, wherein the historical data for the entity comprises a first modality of the plurality of modalities, a second modality of the plurality of modalities, and a third modality of the plurality of modalities, comprising:

inputting, by the one or more processors, the historical data in the first modality into a first neural network to generate a first output;

inputting, by the one or more processors, the historical data in the second modality into a second neural network to generate a second output;

inputting, by the one or more processors, the historical data in the third modality into a third neural network to generate a third output;

concatenating, by the one or more processors, the first output, the second output and the third output to generate a concatenated output; and inputting, by the one or more processors, the concatenated output into a fourth neural network to generate the predetermined representation for the entity.

10. The method of claim 1, comprising:

inputting, by the one or more processors, the data into the distance model to generate the representation;

identifying, by the one or more processors, a first historical representation based on a first data sample of the historical data input into the distance model;

identifying, by the one or more processors, a second historical representation based on a second data sample of the historical data input into the distance model;

identifying, by the one or more processors, a third historical representation based on a third data sample of the historical data input into the distance model;

determining, by the one or more processors, a first distance between the representation and the first historical representation;

determining, by the one or more processors, a second distance between the representation and the second historical representation;

determining, by the one or more processors, a third distance between the representation and the third historical representation; and aggregating, by the one or more processors, the first distance, the second distance and the third distance to determine the distance.

11. A system to manage a session accessed by a client device, comprising:

one or more processors and memory configured to:

receive data in a plurality of modalities corresponding to a plurality of features of the session for an entity accessed by the client device;

determine, based at least in part on the data of the session for the entity and a distance model trained with historical data of the entity that accounts for cross-modal correlations between the plurality of modalities, a distance between a representation corresponding to the data of the session and a predetermined representation for the entity established based on the historical data for the entity;

compare the distance with a threshold established for the entity; and generate, based at least in part on the comparison between the distance with the threshold, an action to manage access by the client device to the session for the entity.

12. The system of claim 11, wherein the one or more processors are further configured to:

identify that the session is provided by a cloud storage service hosted by one or more servers, and the one or more processors are intermediary to the client device and the one or more servers, wherein:

the plurality of modalities comprise at least one of numeric data, categorical data, image data, sound data, a sequence of data, or a combination of at least two of the plurality of modalities, and the plurality of features comprise at least one of a number of files downloaded, a number of files uploaded, a number of files deleted, a number of files updated, a file type, a file size, a download duration, a location of the client device, a timestamp, a download volume over a predetermined time interval, a number of system events, an event type, an IP addresses, a number of IP addresses, an operating system, a browser version, a device name, or a sequence of electronic remote procedure calls.

13. The system of claim 11, wherein the one or more processors are further configured to:

access a data repository storing a plurality of distance models corresponding to a plurality of entities; and select, from the data repository, the distance model for the entity from the plurality of distance models.

14. The system of claim 11, wherein the one or more processors are further configured to:

establish the threshold for the entity based on a distribution of pairwise distances between representations output by a model trained for the entity based on the historical data.

15. The system of claim 11, wherein the one or more processors are further configured to:

determine, based at least in part on the comparison, that the distance is greater than the threshold; and select, responsive to the distance greater than the threshold, the action based at least in part on a security policy associated with the session, the action comprising at least one of:

a request for multifactor authentication, terminating the session, recording the session, locking an account of the entity to prevent subsequent access to the session, or transmitting a push notification to one or more client devices associated with the entity.

16. The system of claim 11, wherein the threshold comprises an entity threshold, a global threshold, and a peer threshold, and the one or more processors are further configured to:
  determine that the distance is greater than each of the entity threshold, the global threshold and the peer threshold; and
  flag, responsive to the distance being greater than each of the entity threshold, the global threshold and the peer threshold, the session as malicious.

17. The system of claim 11, wherein the one or more processors are further configured to:
  determine that the distance is greater than zero and less than the threshold for the entity; and
  allow, responsive to the determination, access by the client device to the session for the entity.

18. The system of claim 11, wherein the one or more processors are further configured to:
  train the distance model with the historical data for one or more entities using a distance-based loss function configured to predict relative distances between inputs for the one or more entities.

19. A non-transitory computer-readable medium comprising processor executable instructions that, when executed by at least one processor, cause the at least one processor to manage a session accessed by a client device, the instructions comprising instructions to:
  receive data in a plurality of modalities corresponding to a plurality of features of the session for an entity accessed by the client device;
  determine, based at least in part on the data of the session for the entity and a distance model trained with historical data of the entity that accounts for cross-modal correlations between the plurality of modalities, a distance between a representation corresponding to the data of the session and a predetermined representation for the entity established based on the historical data for the entity;
  compare the distance with a threshold established for the entity; and
  generate, based at least in part on the comparison between the distance with the threshold, an action to manage access by the client device to the session for the entity.

20. The computer-readable medium of claim 19, wherein the instructions comprise instructions to:
  identify that the session is provided by a cloud storage service hosted by one or more servers, and the one or more processors are intermediary to the client device and the one or more servers, wherein:
    the plurality of modalities comprise at least one of numeric data, categorical data, image data, sound data, a sequence of data, or a combination of at least two of the plurality of modalities, and
    the plurality of features comprise at least one of a number of files downloaded, a number of files uploaded, a number of files deleted, a number of files updated, a file type, a file size, a download duration, a location of the client device, a timestamp, a download volume over a predetermined time interval, a number of system events, an event type, an IP addresses, a number of IP addresses, an operating system, a browser version, a device name, or a sequence of electronic remote procedure calls.

* * * * *